United States Patent
Yonemoto et al.

(10) Patent No.: US 7,113,212 B2
(45) Date of Patent: Sep. 26, 2006

(54) SOLID STATE IMAGING DEVICE, SIGNAL PROCESSING METHOD AND DRIVING METHOD THEREFOR AND CAMERA

(75) Inventors: Kazuya Yonemoto, Tokyo (JP); Takahisa Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 926 days.

(21) Appl. No.: 10/262,050

(22) Filed: Oct. 1, 2002

(65) Prior Publication Data

US 2003/0025817 A1 Feb. 6, 2003

Related U.S. Application Data

(62) Division of application No. 08/951,504, filed on Oct. 16, 1997, now Pat. No. 6,483,541.

(30) Foreign Application Priority Data

| Oct. 17, 1996 | (JP) | ............................... P08-274337 |
| Nov. 5, 1996 | (JP) | ............................... P08-292450 |

(51) Int. Cl.
  H04N 3/14 (2006.01)
  H04N 5/335 (2006.01)
  H04N 5/217 (2006.01)
(52) U.S. Cl. ...................... 348/302; 348/308; 348/241
(58) Field of Classification Search ................ 348/302, 348/307, 257; 257/293
See application file for complete search history.

(56) References Cited

U.S. PATENT DOCUMENTS

| 4,678,938 | A | * | 7/1987 | Nakamura | ................... 327/515 |
| 5,047,861 | A | * | 9/1991 | Houchin et al. | ............ 348/247 |
| 5,187,583 | A | * | 2/1993 | Hamasaki | .................... 348/250 |
| 5,231,503 | A | * | 7/1993 | Nagatake et al. | ........... 348/245 |
| 5,270,531 | A | * | 12/1993 | Yonemoto | ................ 250/208.1 |
| 5,623,306 | A | * | 4/1997 | Kajihara et al. | ............ 348/243 |
| 5,717,458 | A | * | 2/1998 | Yonemoto | ................... 348/305 |
| 5,796,431 | A | * | 8/1998 | Yonemoto | ................... 348/308 |
| 5,808,677 | A | * | 9/1998 | Yonemoto | ................... 348/308 |
| 6,873,362 | B1 | * | 3/2005 | Yonemoto | ................... 348/302 |

\* cited by examiner

*Primary Examiner*—David Ometz
*Assistant Examiner*—Kelly Jerabek
(74) *Attorney, Agent, or Firm*—Sonnenschein Nath & Rosenthal LLP

(57) ABSTRACT

A solid state imaging device and a signal processing method therefor as well as a camera by which a reference signal for cancellation of vertical string-like fixed pattern noises can be obtained readily. In an initial stage after a power supply to the device is made available, a substrate pulse is outputted from a timing generator to reset pixel transistors immediately before pixel signals are read out. Then, in a condition wherein there is no signal originating from incidence of light, an operation pulse signal is caused to rise immediately to read out pixel signals from the pixel transistors through operation switches so as to be held by capacitors. Thereafter, in a horizontal image period, a horizontal scanning pulse signal is outputted from a horizontal shift register to successively put horizontal switches into a connecting state to successively output the signals of the capacitors thereby to obtain a reference signal for cancellation of vertical string-like fixed pattern noises.

9 Claims, 22 Drawing Sheets

F I G. 12
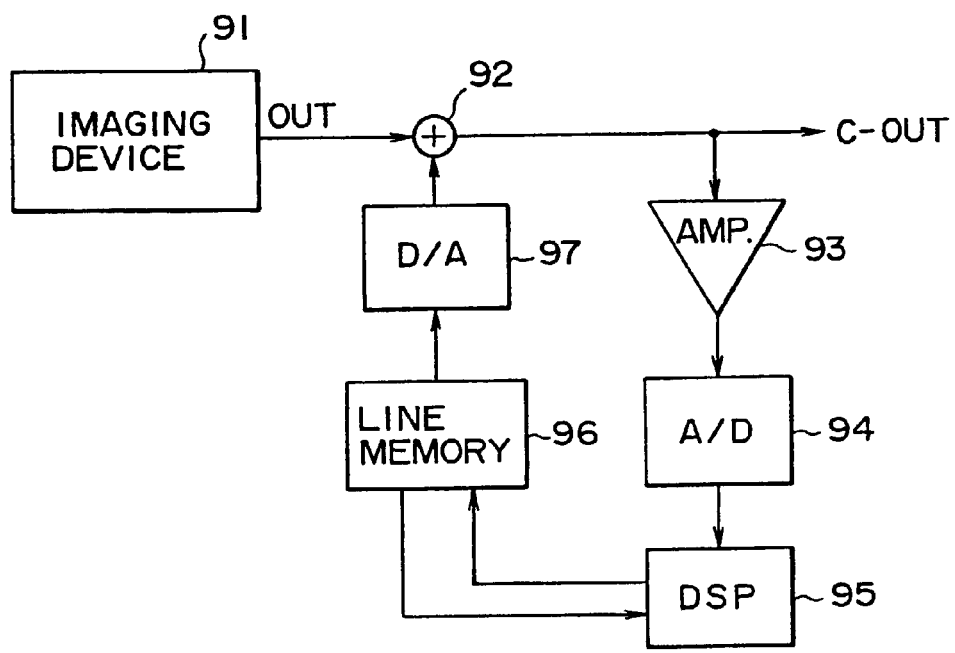
F I G. 13
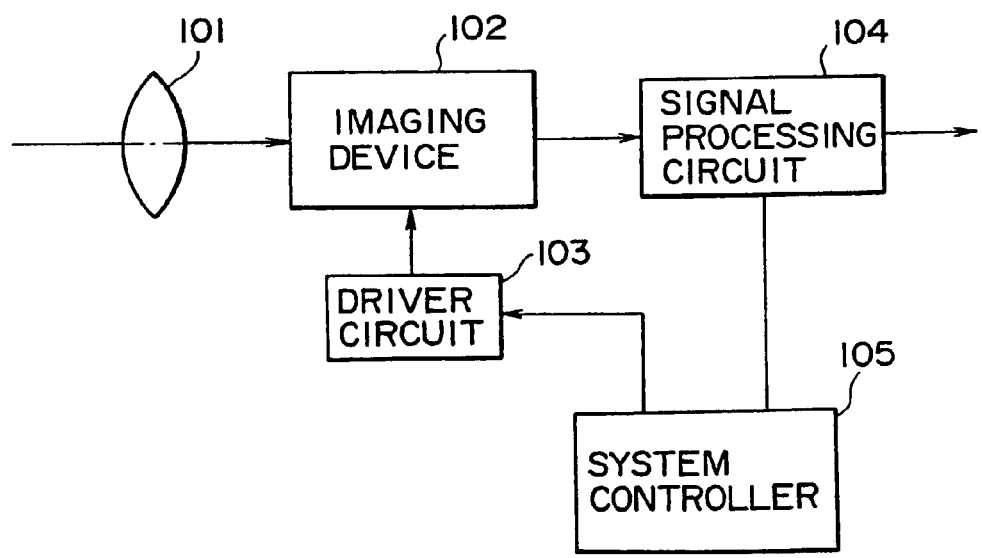

DISCONNECTING STATE OF HORIZONTAL SWITCH

CONNECTING STATE OF HORIZONTAL SWITCH

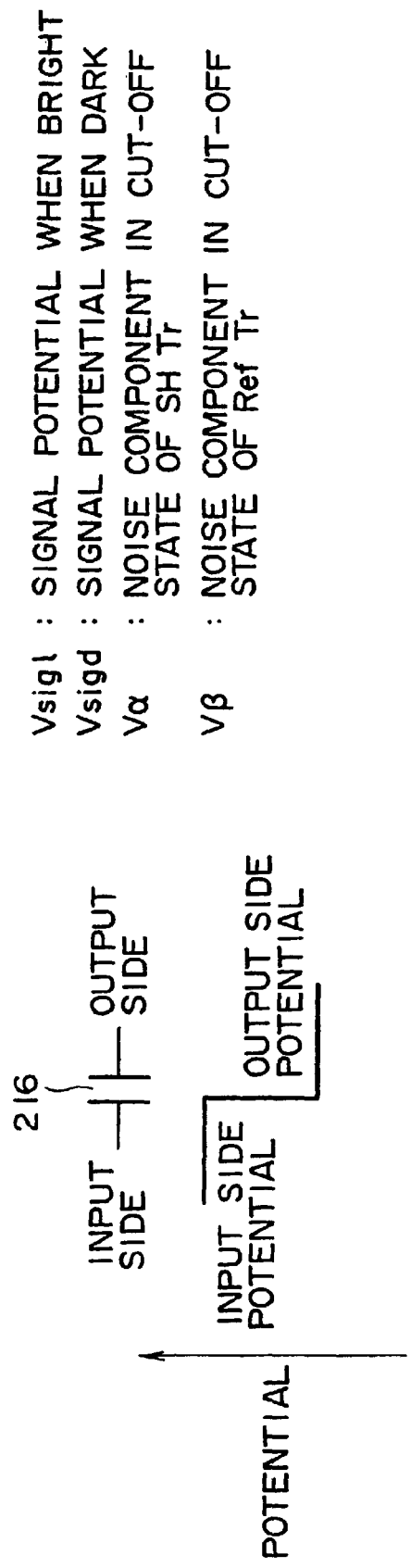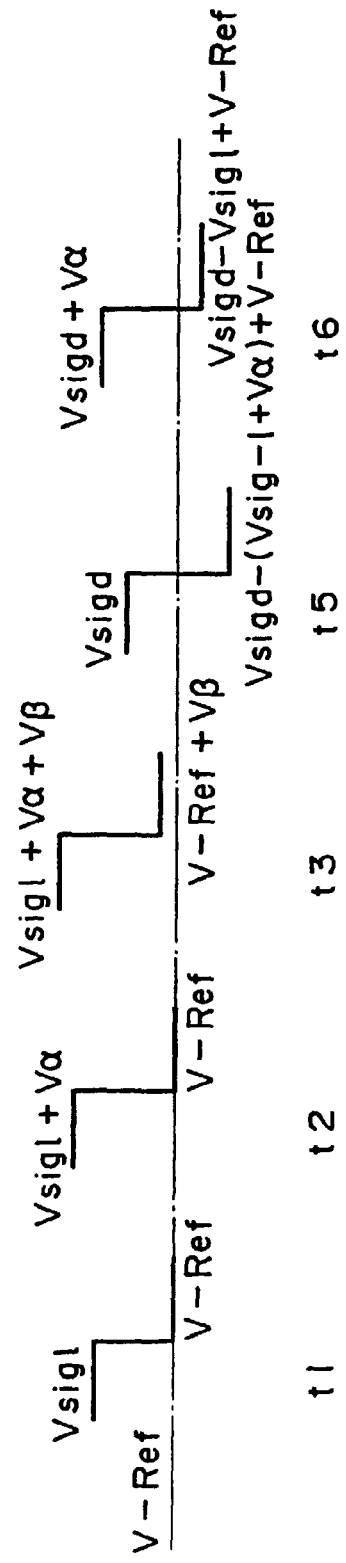
FIG. 21

SOLID STATE IMAGING DEVICE, SIGNAL PROCESSING METHOD AND DRIVING METHOD THEREFOR AND CAMERA

CROSS REFERENCE TO RELATED APPLICATIONS

The above-identified application is a divisional of application Ser. No. 08/951,504 filed Oct. 16, 1997 now U.S. Pat. No. 6,483,541.

BACKGROUND OF THE INVENTION

This invention relates to a solid state imaging device, a signal processing method and a driving method therefor and a camera, and more particularly to an X-Y address type solid state imaging device as represented by an amplification type solid state imaging device and a signal processing method for the solid state imaging device as well as a camera which employs an X-Y address type solid state imaging device as an imaging device. The present invention further relates to an amplification type solid state imaging device wherein pixels themselves have an amplification function and signals of the pixels are outputted as voltages and a driving method for the amplification type solid state imaging device.

An X-Y address type solid state imaging device includes, as shown in FIG. 14, a pixel section 111 wherein a large number of pixels are arranged in rows and columns, a vertical scanning circuit 112 for successively selecting the rows of the pixel section 111, a horizontal scanning circuit 113 for successively selecting the columns of the pixel section 111, and an output circuit (charge detection circuit) 114 for outputting a signal. The vertical scanning circuit 112 and the horizontal scanning circuit 113 are each formed from, for example, a shift register and successively generate a vertical scanning (vertical selection) pulse signal $\phi V$ and a horizontal scanning pulse signal $\phi H$ one by one for each row and each column, respectively.

In this X-Y address type solid state imaging device, when the horizontal scanning circuit 113 holds signal charge of the pixels in capacitors and outputs the pixel signals of the capacitors to the output circuit 114 from a horizontal signal line via horizontal switches each formed from a MOS transistor, dispersions in threshold voltage Vth of the horizontal switches (MOS transistors) are superposed on the pixel signals, and they appear as vertical string-like fixed pattern noises on a screen, deteriorating the picture quality.

Here, a generation mechanism of vertical string-like fixed pattern noises generated from the horizontal scanning circuit 113 is described with reference to an equivalent circuit of a signal path for the nth column of the horizontal scanning circuit 113 shown in FIG. 15. As a presupposition of description, notice is taken here of a dispersion in threshold voltage Vth of a horizontal switch.

Referring to FIG. 15, a pixel signal held by a capacitor 121 flows as charge to a horizontal signal line 123 when a horizontal scanning pulse $\phi Hn$ is supplied from a horizontal shift register (not shown) to the gate electrode of a horizontal switch 122 so that the horizontal switch 122 is put into a connecting state, and is then demodulated into a voltage by and outputted from an output circuit 124. In this instance, if the threshold voltage Vth which defines the boundary between a disconnecting state and a connecting state of the horizontal switch 122 exhibits a dispersion for each of the horizontal switches of the individual columns, then charge represented by the product of the dispersion in threshold voltage Vth and a variation amount in capacitance generated between the horizontal switch 122 and the horizontal signal line 123 appears on the horizontal signal line 123. Therefore, a vertical string-like fixed pattern noise which corresponds to the charge amount is superposed with the pixel signal.

The manner of such superposition is described with reference to FIGS. 16A and 16B which show equivalent circuits where the horizontal switch 122 is converted into a capacitance model. More particularly, FIG. 16A shows an equivalent circuit where the horizontal switch (MOS transistor) 122 is in a disconnecting (off) state, and FIG. 16B shows an equivalent circuit where the horizontal switch (MOS transistor) 122 is in a connecting (on) state.

In FIG. 16A, the horizontal switch 122 is in a disconnecting state and, as a capacitance model, a gate-drain capacitance 122a is produced between the gate electrode of a horizontal switch (MOS transistor) to which a horizontal scanning pulse $\phi Hn$ is applied and the capacitor 121 by which a pixel signal is held while a gate-source capacitance 122b is produced between the gate electrode of the horizontal switch and the horizontal signal line 123, and the capacitor 121 and the horizontal signal line 123 are disconnected from each other.

On the other hand, in FIG. 16B, the horizontal switch 122 is in a connecting state and the capacitor 121 is connected to the horizontal signal line 123, and a gate-channel capacitance 122c is produced between the gate electrode of the horizontal switch (MOS transistor) to which a horizontal scanning pulse $\phi Hn$ is applied and the horizontal signal line 123. Here, the capacitance of the gate-channel capacitance 122c is considerably higher than the total capacitance of the capacitance 122a and the capacitance 122b.

Since the two states of FIGS. 16A and 16B are changed over with reference to the threshold voltage Vth of the horizontal switch 122 by the voltage of the horizontal scanning pulse $\phi Hn$ applied to the gate electrode of the horizontal switch 122, if the horizontal switch of each column has a dispersion in threshold voltage Vth, then the product of the dispersion in threshold voltage Vth and the difference between the capacitances of the horizontal switch 122 in the two states of FIGS. 16A and 16B appears as dispersion charge on the horizontal signal line 123 and makes a vertical string-like fixed pattern noise.

Now, where the capacitances of the capacitance 122a, capacitance 122b and capacitance 122c are represented by Cdg, Cgs and Cg, respectively, the dispersion of the threshold voltage Vth of the horizontal switch 122 is represented by $\Delta Vth$, the dispersion charge appearing on the horizontal signal line 123 is represented by $\Delta q$, the capacitance of a detection capacitor 125 of the output circuit 124 is represented by Cd, and a vertical string-like fixed pattern noise appearing on the output is represented by $\Delta Vout$, the dispersion charge $\Delta q$ and the fixed pattern noise $\Delta Vout$ are given by $\Delta q = (Cg - Cgd - Cgs) \cdot \Delta Vth$ $\Delta Vout = \Delta q / Cd$ Particularly, giving an example of numerical values, if Cgd and Cgs are 1 fF, Cg is 20 fF, the dispersion $\Delta Vth$ of the threshold voltage Vth is 50 mV and the capacitance Cd of the detection capacitor 125 is 0.5 pF, then the fixed pattern noise $\Delta Vout$ is 1.8 mV.

Driving timings of the ordinary X-Y address type solid state imaging device and a manner in which vertical string-like fixed pattern noises appear are illustrated in a timing chart of FIG. 17. A vertical scanning pulse signal $\phi V$ ($\phi V1, \ldots, \phi Vm, \phi Vm+1, \ldots$) for selecting pixel elements of the same row successively rises for each horizontal blanking period, and an operation pulse signal φOP rises in synchronism with the vertical scanning pulse signal φV. The operation pulse signal φOP is applied to the gate electrode of an operation switch (not shown) formed from a MOS transistor for reading out a pixel signal to the capacitor 121.

As the operation pulse signal φOP rises, pixel signals of a selected row are read out into the capacitors 121. The pixel signals of the certain row held in the capacitors 121 are, when a horizontal image period is entered, read out from the output circuits 124 as the horizontal switches 122 are successive put into a connecting state when the horizontal scanning pulse signal φH (φH1, . . . , φHn, φHn+1, . . . ) outputted from the horizontal shift register successively rises.

In this instance, if it is assumed, for example, that an equal signal amount is outputted from all pixels and only the threshold voltages Vth of the horizontal switches 122 have individual dispersions, then as seen in the timing chart of FIG. 17, an output signal OUT does not exhibit an equal signal amount, but exhibits dispersions in threshold voltage Vth of the horizontal switches 122 superposed on the pixel signals. Then, the dispersions appear as vertical string-like fixed pattern noises on the screen, deteriorating the picture quality.

As a method of preventing deterioration of the picture quality arising from vertical string-like fixed pattern noises, a possible method is to extract only fixed pattern noise components, hold them as a reference signal for cancellation and subtract, in an ordinary imaging operation, the reference signal from signal outputs of the solid state imaging device to cancel the fixed pattern noises.

However, while, in the description of the generation mechanism of fixed pattern noises given above, a manner in which fixed pattern noises appear on an output signal in the condition that no incident light is received is described, if light is irradiated upon a central portion of the imaging area here, then signal components arising from the incident light are added to the fixed pattern noise components, and such an output signal waveform as indicated by OUT-L in FIG. 17 is obtained. This output signal cannot be used as a reference signal for cancellation.

In other words, in a conventional X-Y address type solid state imaging device, in order to cancel vertical string-like fixed pattern noises, the solid state imaging device must be shielded against incident light by some method so as to output only fixed pattern noise components as a reference for a correction signal. More particularly, such a mechanical operation that a cover is fitted on the lens of the camera or incident light is intercepted by a mechanical shutter is required. Such an operation is disadvantageous in terms of the price or minimization of a camera since it urges a person who operates the camera to perform a manual operation for cancellation of fixed pattern noises or requires a part which is not originally necessitated for a camera such as a mechanical shutter.

Meanwhile, as amplification type solid state imaging devices, a CMD (Charge Modulation Device), a BASIS (Base Stored Image Sensor), a BCMD (Bulk Charge Modulation Device) and so forth are known. In those amplification type solid state imaging devices, since pixels are formed using an active element of a MOS structure or the like in order to make the pixels themselves have an amplification function, a dispersion in characteristic (threshold value Vth and so forth) of an active element is superposed as it is on an image signal. Since the dispersion in characteristic has a fixed value for each pixel, it appears as a fixed pattern noise (FPN) on a screen.

An exemplary one of conventional amplification type solid state imaging devices constructed so as to remove fixed pattern noises arising from characteristic dispersions of pixels is shown in FIG. 24. Referring to FIG. 24, a large number of pixels 301 are arranged in rows and columns, and control input terminals of the pixels 301 are individually connected to vertical selection lines 302 in units of a row while output terminals of the pixels 301 are connected to vertical signal lines 303 in units of a column. Terminals of the vertical selection lines 302 on one side are connected to output terminals of a vertical scanning circuit 304 for the individual rows. The vertical scanning circuit 304 is formed from a shift register or a like element and successively outputs a vertical scanning pulse signal φV (φV1, . . . , φVm, φVm+1, . . . ).

Connected to each of the vertical signal lines 303 are the drains of two sampling switches 305s and 305n each formed from an N-channel MOS transistor. An operation pulse signal φOPS for sampling a signal voltage in a bright state prior to pixel resetting outputted from a pixel 301 is applied to the gates of the sampling switches 305s. Meanwhile, another operation pulse signal φOPN for sampling a signal voltage in a dark state after pixel resetting outputted from a pixel 301 is applied to the gates of the sampling switches 305n.

The sources of the sampling switches 305s and 305n are connected to terminals of two capacitors 306s and 306n on one side, respectively. The capacitors 306s and 306n are provided to hold a signal voltage in a bright state and a signal voltage in a dark state, respectively, while the other terminals of them are grounded commonly. The sources of the sampling switches 305s and 305n are further connected to the drains of two horizontal selection switches 307s and 307n formed from N-channel MOS transistors, respectively.

The sources of the horizontal selection switches 307s and 307n are connected to a horizontal signal line 308, and the gates of the horizontal selection switches 307s and 307n are connected to output terminals of a horizontal scanning circuit 309 for the individual columns. The horizontal scanning circuit 309 is formed from a shift register or a like element and outputs a horizontal scanning pulse signal φH ( . . . , φHn, φHn+1, . . . ) for successively turning on the horizontal selection switches 307s and the horizontal selection switches 307n for the individual columns. The horizontal signal line 308 is connected to an input terminal of a horizontal output circuit 310. An output terminal of the horizontal output circuit 310 is connected to an input terminal of a CDS (correlation double sam-pling) circuit 311.

Subsequently, circuit operation of the conventional apparatus having the construction described above for removing fixed pattern noises is described.

If a certain row is selected by vertical scanning by the vertical scanning circuit 304 in a horizontal blanking period, then signal voltages in a bright state prior to pixel resetting and signal voltages in a dark state after pixel resetting of the pixels 301 of the selected row are successively sampled by the sampling switches 305s and 305n and held by the capacitors 306s and 306n, respectively.

Then, in a horizontal effective period, when a certain column is selected by horizontal scanning by the horizontal scanning circuit 309 and the horizontal selection switches 307s and 307n of the selected column are successively turned on, the signal voltages in a bright state and the signal voltages in a dark state held in the capacitors 306s and 306n are successively read out into the horizontal signal line 308, respectively. Consequently, the signal voltages in a bright state and the signal voltages in a dark state are successively transmitted in units of a column on a time base by the horizontal signal line 308 and supplied to the CDS circuit 311 through the horizontal output circuit 310.

By the CDS circuit 311, correlation double sampling of the signal voltages in a bright state and the signal voltages in a dark state which successively appear on the time base is performed, and finite differences between them are calculated to cancel noise components. As a result, a signal from which fixed pattern noises arising from dispersions in characteristic such as a threshold voltage Vth for the pixels 301 have been removed is obtained.

However, with the conventional amplification type solid state imaging device described above, while fixed pattern noises arising from characteristic dispersions of the pixels 301 can be removed, since the flows of signals in a bright state and a dark state are different in the sample hold circuit between the vertical signal lines 303 and the horizontal signal line 308, if some components are superposed on a signal by the sample hold circuit, then those components remain also after the correlation double sampling by the CDS circuit 311.

What are present as components which are superposed by the sample hold circuit are distribution noises of the sampling switches 305s and 305n and so forth. Where those components are different between columns because of dispersions in circuit characteristic, also the components which remain after the correlation double sampling exhibit dispersions and appear as vertical string-like fixed pattern noises on the screen.

SUMMARY OF THE INVENTION

It is an object of the present invention to provide a solid state imaging device and a signal processing method therefor as well as a camera by which a reference signal for cancellation of vertical string-like fixed pattern noises can be obtained readily even if a person who operates a camera is not urged to perform a manual operation or without using a mechanical shutter.

It is another object of the present invention to provide a solid state imaging device and a driving method for the same by which not only fixed pattern noises arising from characteristic dispersions of pixels but also vertical string-like fixed pattern noises arising from dispersions in characteristic of circuits can be suppressed.

In order to attain the object described above, according to an aspect of the present invention, there is provided a solid state imagining device, comprising a plurality of pixels arranged in rows and columns, a vertical scanning circuit for controlling control electrodes of the pixels in the same rows connected commonly by vertical selection lines, a horizontal scanning circuit for successively outputting pixel signals outputted through vertical signal lines, to which main electrodes of the pixels of the same columns are commonly connected, in units of a row, and an output circuit for outputting the pixel signals from the horizontal scanning circuit to the outside, the solid state imaging device having a first operation mode in which the pixels are reset after the pixel signals are read out and a second operation mode in which the pixel signals are read out after the pixels are reset.

In the solid state imaging device, in the first operation mode, the pixels are reset after pixel signals are read out, and consequently, an ordinary imaging operation is performed. On the other hand, in the second operation mode, since pixel signals are read out after the pixels are reset, processing for obtaining a reference signal for cancellation of vertical string-like fixed pattern noises which are generated from the horizontal scanning circuit is performed irrespective of whether or not there is incident light.

With the solid state imaging device, since it is constructed such that it has, separately from an ordinary imaging mode, an operation mode wherein pixel signals are read out after pixels are reset, a reference signal for canceling vertical string-like fixed pattern noises generated from a horizontal scanning circuit and so forth can be obtained readily by varying the operation timing of a vertical scanning circuit irrespective of whether or not there is incident light.

According to another aspect of the present invention, there is provided a signal processing method for a solid state imagining device which includes a plurality of pixels arranged in rows and columns, a vertical scanning circuit for controlling control electrodes of the pixels in the same rows connected commonly by vertical selection lines, a horizontal scanning circuit for successively outputting pixel signals outputted through vertical signal lines, to which main electrodes of the pixels of the same columns are commonly connected, in units of a row, and an output circuit for outputting the pixels signals from the horizontal scanning circuit to the outside, and has a first operation mode in which the pixels are reset after the pixel signals are read out and a second operation mode in which the pixel signals are read out after the pixels are reset, comprising the steps of holding an output signal of the solid state imaging device obtained in the second operation mode as a reference signal, and performing, in the first operation mode, correction processing of the output signal of the solid state imaging device using the reference signal.

In the signal processing method, the output signal of the solid state imaging device obtained in the second operation mode is held as a reference signal for cancellation of vertical string-like fixed pattern noises generated from the horizontal scanning circuit. Then, in the first operation mode, the reference signal stored and held is subtracted from the output signal of the solid state imaging device to cancel the vertical string-like fixed pattern noises generated from the horizontal scanning circuit.

With the signal processing method for a solid state imaging device, since an output signal obtained in the second operation mode from the solid state imaging device is stored and held as a reference signal and, in the first operation mode, the reference signal is used to correct the output signal of the solid state imaging device, that is, to cancel fixed pattern noises of the output signal, vertical string-like fixed pattern noises generated from the horizontal scanning circuit and so forth can be canceled with certainty.

According to a further aspect of the present invention, there is provided a camera, comprising a solid state imaging device which includes a plurality of pixels arranged in rows and columns, a vertical scanning circuit for controlling control electrodes of the pixels in the same rows connected commonly by vertical selection lines, a horizontal scanning circuit for successively outputting pixel signals outputted through vertical signal lines, to which main electrodes of the pixels of the same columns are commonly connected, in units of a row, and an output circuit for outputting the pixels signals from the horizontal scanning circuit to the outside, and has a first operation mode in which the pixels are reset after the pixel signals are read out and a second operation mode in which the pixel signals are read out after the pixels are reset, an optical system for introducing incident light to an imaging area of the solid state imaging device, and a signal processing circuit for holding an output signal of the solid state imaging device obtained in the second operation mode as a reference signal and performing correction processing of the output signal of the solid state imaging device in the first operation mode using the reference signal.

In the camera, in the second operation mode of the solid state imaging device, a reference signal for cancellation of vertical string-like fixed pattern noises is obtained without being influenced by incident light or the like even if mechanical light interception means such as a shutter is not used. The reference signal is stored and held in the signal processing circuit. Then, in the first operation mode, the reference signal stored and held is subtracted from the output signal of the solid state imaging device by the signal processing circuit to cancel vertical string-like fixed pattern noises generated from the horizontal scanning circuit.

With the camera, in the second operation mode of the solid state imaging device, even if mechanical light interception means such as a shutter is not used, a reference signal for cancellation of vertical string-like fixed pattern noises generated from the horizontal scanning circuit is obtained without being influenced by incident light or the like, and in the first operation mode, correction processing for an output signal of the solid state imaging device is performed with certainty by the signal processing circuit using the reference signal. Consequently, an image output of a high picture quality can be obtained.

According to a yet further aspect of the present invention, there is provided a solid state imaging device, comprising a plurality of pixels arranged in rows and columns, first switch means provided for each of the columns and having a first terminal connected to a vertical signal line to which output terminals of the plurality of pixels are connected in units of a column, first and second storage means provided for each of the columns and having first terminals connected commonly to a second terminal of the first switch means, second and third switch means provided for each of the columns and connected between second terminals of the first and second storage means and a reference potential point, and a vertical output circuit provided for each of the columns and including a horizontal selection switch connected between the second terminal of the first storage means and a horizontal signal line.

According to a yet further aspect of the present invention, there is provided a driving method for a solid state imaging device which includes a plurality of pixels arranged in rows and columns, first switch means provided for each of the columns and having a first terminal connected to a vertical signal line to which output terminals of the plurality of pixels are connected in units of a column, first and second storage means provided for each of the columns and having first terminals connected commonly to a second terminal of the first switch means, second and third switch means provided for each of the columns and connected between second terminals of the first and second storage means and a reference potential point, and a vertical output circuit provided for each of the columns and including a horizontal selection switch connected between the second terminal of the first storage means and a horizontal signal line, comprising the steps of turning on, in a horizontal blanking period, the first switch means to sample a signal in a bright state while the second switch means is in an on-state and then turning off the first switch means to hold the signal in the bright state in the first storage means, turning off the second switch means and then turning on the third switch means which is in an off-state, turning on the first switch means again to sample a signal in a dark state and then turning off the first switch means again to hold the signal in the dark state into the second storage means, and turning on, in a horizontal effective period, the horizontal selection switch to read out a voltage on the output side of the first storage means into the horizontal signal line and then turning on the second switch means to read out a reference potential into the horizontal signal line.

In the solid state imaging device and the driving method for a solid state imaging device, in a horizontal blanking period, the first switch means is first turned on to sample a signal in a bright state after pixel resetting while the second switch means is in an on-state, and then the first switch means is turned off to hold the signal in the bright state in the first storage means. In this instance, noise components caused by the switching of the first switch means are superposed on the first storage means. Then, the second switch means is turned off. In this instance, since the input side of the first storage means is in a floating state, noise components caused by the switching of the second switching means are not superposed on the first storage means.

Thereafter, the third switch means is turned on, and then, the first switch means is turned on again to sample a signal in a dark state obtained by resetting the pixels or the like. Then, the first switch means is turned off to hold the sampled signal in the dark state into the second storage means. In this instance, since the second storage means is connected to the output side of the first switch means, similarly as in the case wherein the signal in the bright state is held, noise components caused by the switching of the first switch means are superposed on the second storage means.

As a result, on the output side of the first storage means, noise components arising from characteristic dispersions of circuits, which make a factor of vertical string-like fixed pattern noises superposed on the first and second storage means, that is, caused by the switching of the first switch means, are canceled, and besides, a reference potential is added to signal components from which a finite difference between the signal in the bright state and the signal in the dark state, that is, fixed pattern noises arising from characteristic dispersions of the pixels, have been removed and a resulting signal is outputted.

Thereafter, in a horizontal effective period, the horizontal selection switch is turned on to read out a voltage on the output side of the first storage means, that is, the signal obtained by adding the reference potential to the signal components (the finite difference between the signal in the bright state and the signal in the dark state), into the horizontal signal line. Then, the second switch means is turned on to read out the reference potential.

Consequently, the signal obtained by adding the reference potential to the signal components and the reference potential are transmitted successively in units of a column on the time base to the horizontal output circuit by the horizontal signal line. Then, as a finite difference between the signal obtained by adding the reference potential to the signal components and the reference potential is calculated, characteristic dispersions of the circuits between columns of the vertical output circuit on which the two signals are superposed commonly are canceled. As a result, a signal from which not only fixed pattern noises arising from characteristic dispersions of the pixels but also vertical string-like fixed pattern noises arising from characteristic dispersions of the circuits have been canceled is obtained.

In summary, with the solid state imaging device and the driving method for a solid state imaging device, since a circuit which reads out a signal voltage in a bright state and a signal voltage in a dark state from each pixel into a horizontal signal line is constructed such that read-out paths for the two signal voltages are made same as each other, not only fixed pattern noises arising from characteristic dispersions of the pixels but also vertical string-like fixed pattern noises arising from characteristic dispersions of circuits can be suppressed.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 12 is a block diagram showing an example of a construction of a signal processing circuit in which a solid state imaging device according to the present invention is incorporated;

FIG. 13 is a schematic block diagram of a camera to which the present invention is applied;

FIG. 21 is a diagrammatic view illustrating operation of the solid state imaging device of FIG. 18;

DESCRIPTION OF THE PREFERRED EMBODIMENTS

Figure 1:
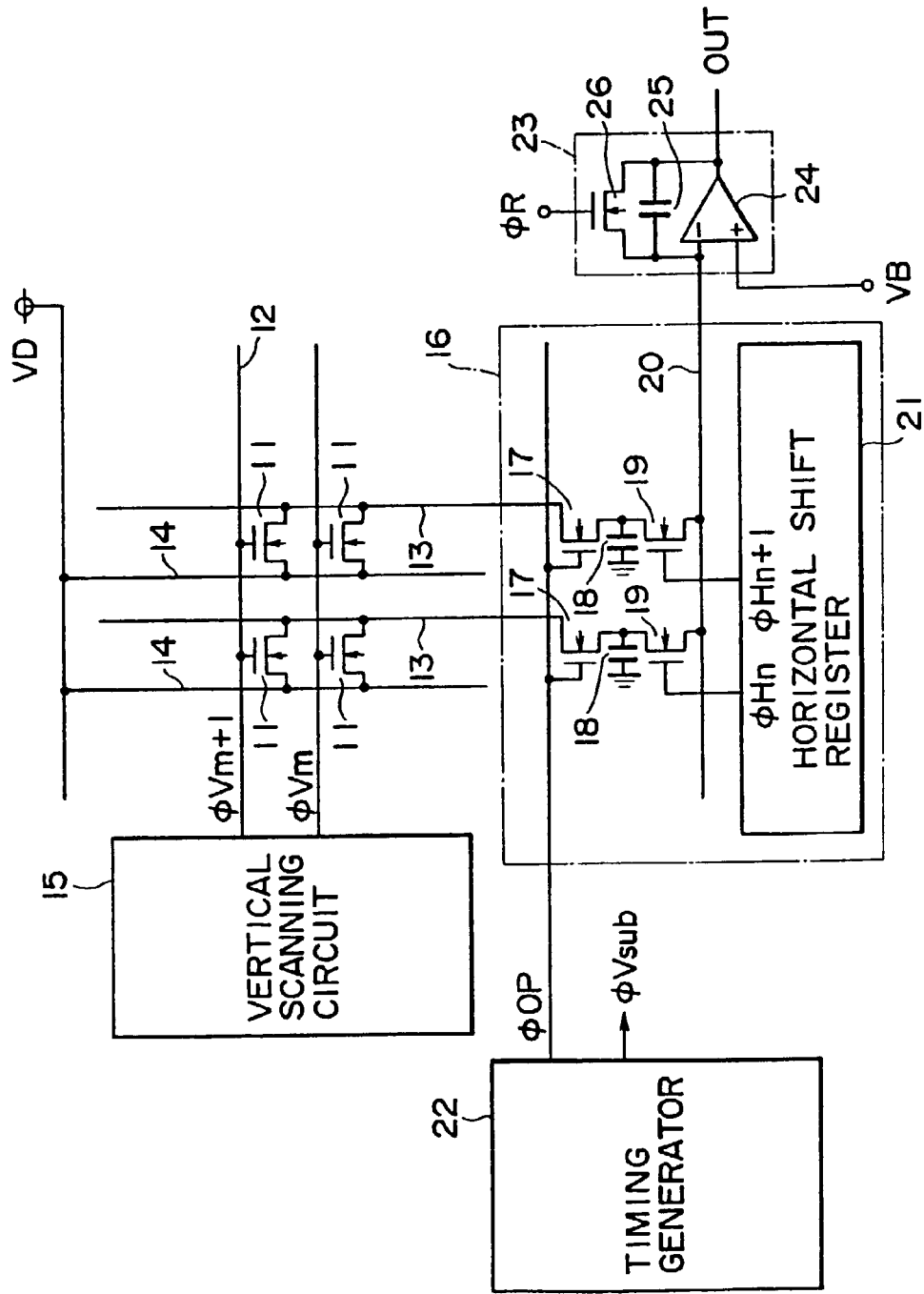
FIG. 1 is a schematic block diagram of an amplification type solid state imaging device to which the present invention is applied.

Referring first to FIG. 1, there is shown in schematic block diagram an amplification type solid state imaging device which is a kind of X-Y address type solid state imaging device to which the present invention is applied.

The solid state imaging device includes a large number of pixel transistors 11 (which are shown as NMOS transistors in FIG. 1) arranged in rows and columns. Of the pixel transistors 11, the gate electrodes are connected in units of a row to vertical selection lines 12, the source electrodes are connected in units of a column to vertical signal lines 13, and the drain electrodes are connected to power supply lines 14 of a power supply voltage VD. The vertical selection lines 12 are individually connected to output terminals of a vertical scanning circuit 15 for the individual rows. The vertical scanning circuit 15 is formed from a shift register or a like element and provides a vertical scanning (vertical selection) pulse signal φV (φV1, . . . , φVm, φVm+1, . . . ) to each of the vertical selection lines 12 in order to vertically scan to read out pixel signals for each row.

The vertical signal lines 13 are connected to a horizontal scanning circuit 16. The horizontal scanning circuit 16 includes operation switches 17 formed from MOS transistors, capacitors 18, horizontal switches 19 formed from MOS transistors, a horizontal signal line 20 and a horizontal shift register 21.

In the horizontal scanning circuit 16, an operation pulse signal φOP outputted from a timing generator 22 is applied to the gate electrodes of the operation switches 17. The vertical signal lines 13 are connected to the drain electrodes of the operation switches 17, and terminals of the capacitors 18 and the drain electrodes of the horizontal switches 19 on one side are connected to the source electrodes of the operation switches 17. The other terminals of the capacitors 18 are grounded. The source electrodes of the horizontal switches 19 are connected to the horizontal signal line 20, and the gate electrodes of the horizontal switches 19 are connected to output terminals of the horizontal shift register 21 for the individual columns.

The horizontal shift register 21 provides a horizontal scanning pulse signal φH (φH1, . . . , φHn, φHn+1, . . . ) to each of the gate electrodes of the horizontal switches 19 in order to horizontally scan to read out pixel signals held by the capacitors 18 for the individual columns. The timing generator 22 generates various timing pulses including the operation pulse signal φOP and generates a substrate pulse φVsub. for resetting the pixel transistors 11. The substrate pulse φVsub. is applied to a substrate to break potential barriers of the individual pixels on the substrate side to sweep out charge accumulated in the pixels to the substrate to effect pixel resetting.

The horizontal signal line 20 is connected to the negated (−) input terminal of an operational amplifier 24 which forms an output circuit 23. Applied to the non-negated (+) input terminal of the operational amplifier 24 is a predetermined bias voltage VB which defines an operation potential of the horizontal signal line 20. The output circuit 23 is formed from the operational amplifier 24, a detection capacitor 25 connected between the negated input terminal and an output terminal of the operational amplifier 24, and a reset switch 26 formed from a MOS transistor connected in parallel to the detection capacitor 25. A reset pulse φR is applied to the gate electrode of the reset switch 26.

In the amplification type solid state imaging device of the construction described above, the solid state imaging device of the present embodiment is characterized in an operation timing wherein, in order to obtain a reference signal for cancellation of vertical string-like fixed pattern noises, different from an operation timing in an ordinary imaging operation, only fixed pattern noise components to be used as a reference signal for cancellation are outputted irrespective of whether or not incident light is present. In particular, at an initial state after a power supply to the device is made available, pixel resetting is performed immediately before pixel signals are read out so that signal components originating from incident light may not be added to fixed pattern noises.

Figure 2:
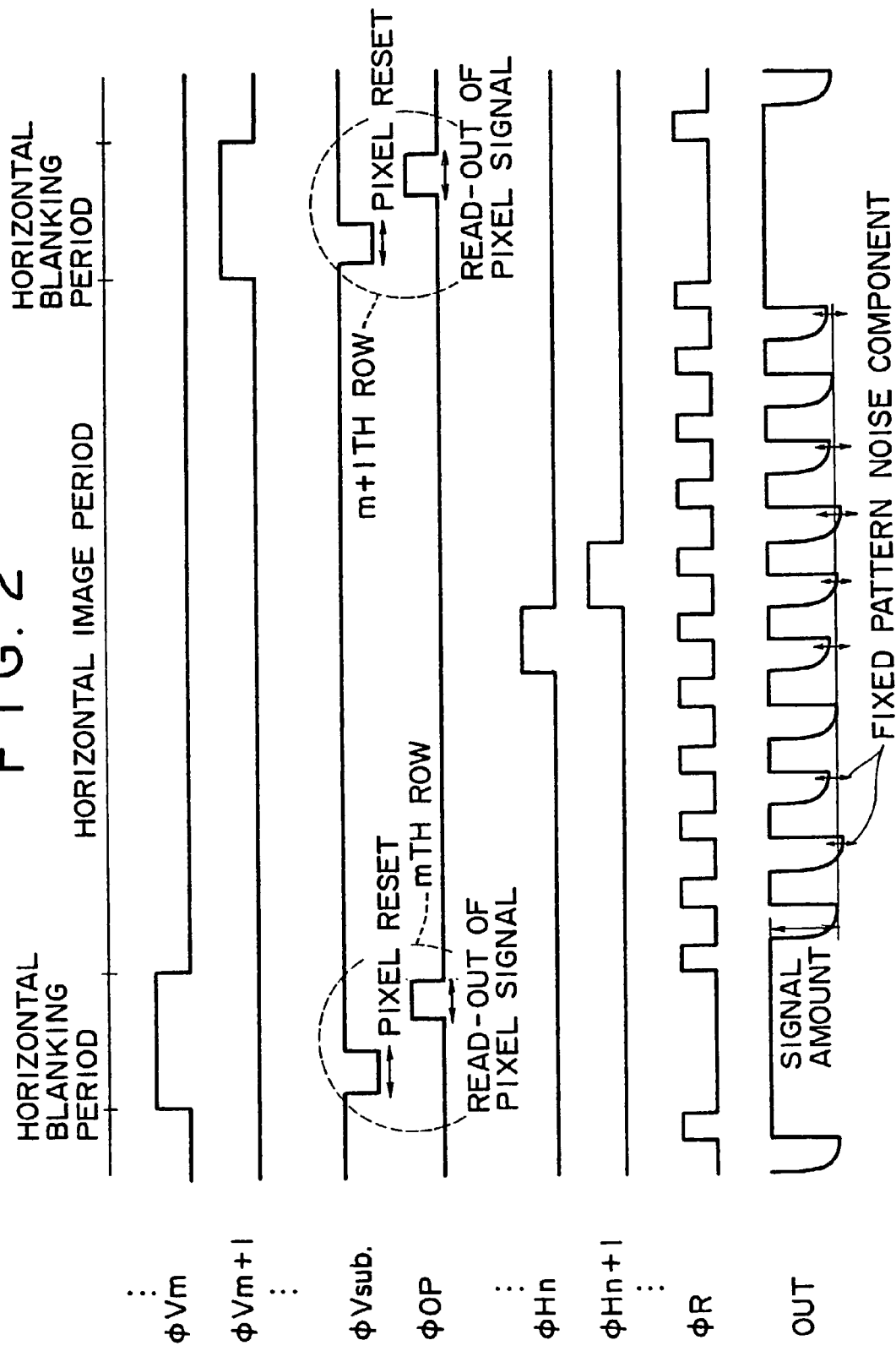
FIG. 2 is a timing chart illustrating operation of the solid state imaging device of FIG. 1.

More particularly, the timing generator 22 first generates a substrate pulse φVsub. in the former half of a horizontal blanking period as seen in a timing chart of FIG. 2 to reset the pixel transistors 11 of a selected row, and then generates an operation pulse signal φOP immediately in a condition wherein there is no signal originating from incident light so that signals of the selected row are read out.

Subsequently, circuit operation for obtaining a reference signal for cancellation of vertical string-like fixed pattern noises in an initial stage after a power supply to the device is made available is described with reference to the flow chart of FIG. 2.

In a horizontal blanking period, the pixel transistors 11 in the mth row are selected as a vertical scanning pulse φVm is provided from the vertical scanning circuit 15 to the vertical selection line 12 connected commonly to the gate electrodes of the pixel transistors 11 of the mth row. Then, when a substrate pulse φVsub. is outputted from the timing generator 22 in the former half of the horizontal blanking period, the pixel transistors 11 of the selected mth row are reset, and then immediately in a condition wherein there is no signal originating from incident light, an operation pulse φOP is outputted from the timing generator 22 so that the signals of the pixel transistors 11 of the selected mth row are outputted to the capacitors 18 through the operation switches 17.

Thereafter, when a horizontal image period is entered, the signals read out from the pixel transistors 11 and held in the capacitors 18 are sent from the horizontal signal line 20 to the output circuit 23 through the horizontal switches 19 as the horizontal switches 19 are successively put into a connecting state in response to a horizontal scanning pulse signal φH (φH1, ..., φHn, φHn+1, ...) outputted from the horizontal shift register 21. Consequently, an output signal which has such an output waveform as shown in the timing charge of FIG. 2 and includes only vertical string-like fixed pattern noise components of the imaging device is obtained.

As described above, since, in an initial state after a power supply to the device is made available, an operation for pixel resetting is performed immediately before pixel signals are read out and then the pixel signals are read out immediately in a condition wherein there is no signal originating from incident light, a reference signal for cancellation of vertical string-like fixed pattern noises generated from the horizontal scanning circuit 16 of the imaging device can be obtained readily irrespective of whether or not there is incident light. Accordingly, in order to produce the reference signal, the necessity for urging a person who operates the camera to perform a manual operation or for using a mechanical shutter is eliminated.

Figure 3:
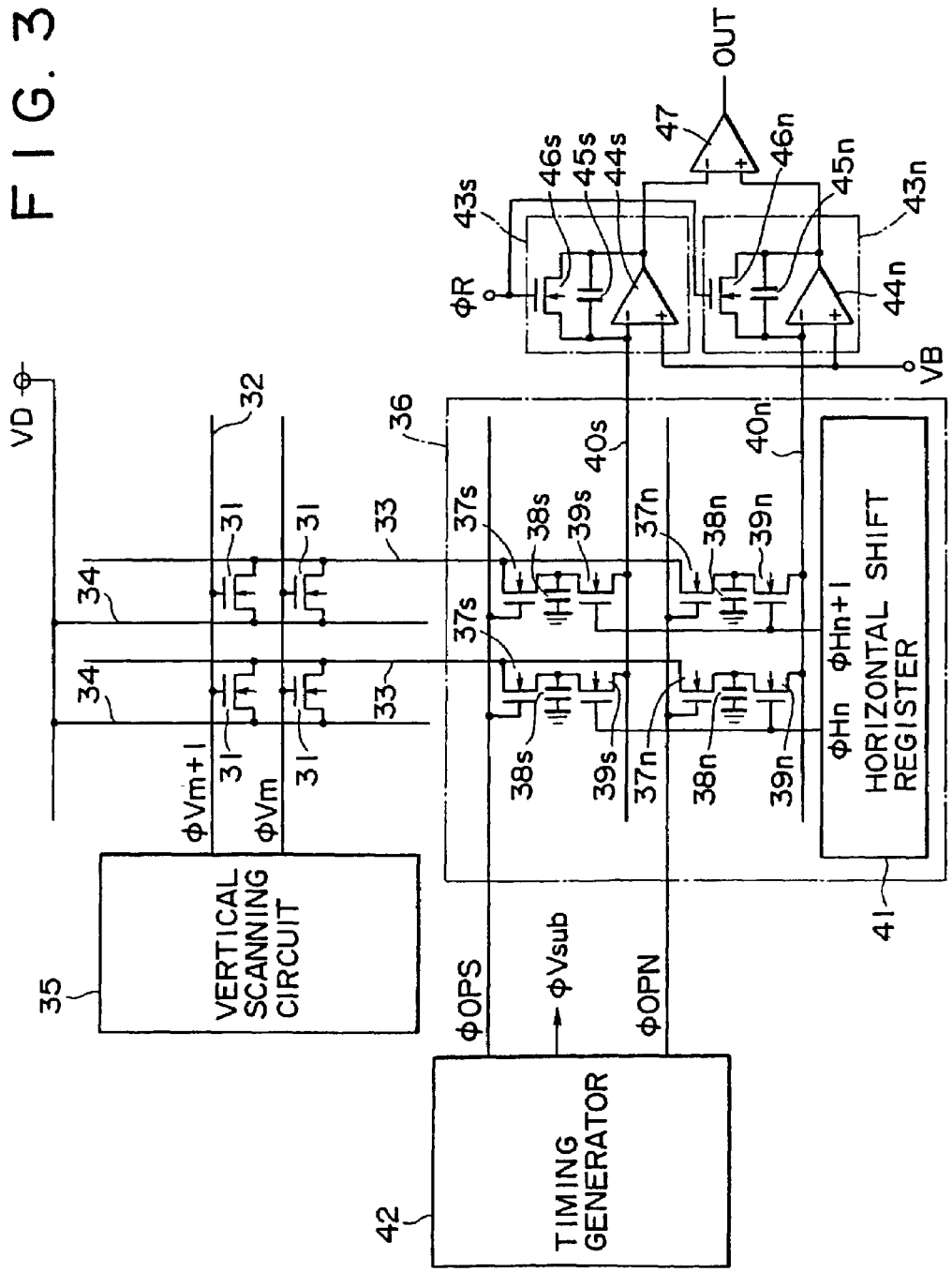
FIG. 3 is a schematic block diagram of another amplification type solid state imaging device to which the present invention is applied.

FIG. 3 is a schematic block diagram showing another amplification type solid state imaging device to which the present invention is applied. The amplification type solid state imaging device according to the present embodiment is generally constructed such that, in order to remove fixed patter noises arising from dispersions of surface potentials of pixels or the like, two pixel signals prior to and after pixel resetting are outputted.

Referring to FIG. 3, a large number of pixel transistors 31 are arranged in rows and columns. Of the pixel transistors 31, the gate electrodes are connected in units of a row to vertical selection lines 32, the source electrodes are connected in units of a column to vertical signal lines 33, and the drain electrodes are connected to power supply lines 34 of a power supply voltage VD. The vertical selection lines 32 are individually connected to output terminals of a vertical scanning circuit 35 for the individual rows. The vertical scanning circuit 35 is formed from a shift register or a like element and provides a vertical scanning (vertical selection) pulse signal φV (φV1, ..., φVm, φVm+1, ...) to each of the vertical selection lines 32 in order to vertically scan to read out pixel signals for each row.

The vertical signal lines 33 are connected to a horizontal scanning circuit 36. The horizontal scanning circuit 36 includes first and second operation switches 37s and 37n formed from MOS transistors, first and second capacitors 38s and 38n, first and second horizontal switches 39s and 39n formed from MOS transistors, horizontal signal lines 40s and 40n and a horizontal shift register 41.

In the horizontal scanning circuit 36, operation pulses φOPS and φOPN outputted from a timing generator 42 are applied to the gate electrodes of the operation switches 37s and 37n, respectively. The vertical signal lines 33 are connected to the drain electrodes of the operation switches 37s and 37n, and terminals of the capacitors 38s and 38n and the drain electrodes of the horizontal switches 39s and 39n on one side are connected to the source electrodes of the operation switches 37s and 37n, respectively. The other ends of the capacitors 38s and 38n are grounded. The source electrodes of the horizontal switches 39s and 39n are connected to the horizontal signal line 40s and 40n, respectively, and the gate electrodes of the horizontal switches 39s and 39n are connected to output terminals of the horizontal shift register 41 for the individual columns.

The horizontal shift register 41 provides a horizontal scanning pulse signal φH (φH1, ..., φHn, φHn+1, ...) to each of the gate electrodes of the horizontal switches 39s and 39n in order to horizontally scan to read out pixel signals held by the capacitors 38s and 38n for the individual columns. The timing generator 42 generates various timing pulses including the operation pulse signals φOPS and φOPN and generates a substrate pulse φVsub. for resetting the pixel transistors 31. The substrate pulse φVsub. is applied to a substrate to break potential barriers of the individual pixels on the substrate side to sweep out charge accumulated in the pixels to the substrate to effect pixel resetting.

The horizontal signal line 40s and 40n are connected to the negated input terminals of operational amplifiers 44s and 44n which form output circuits 43s and 43n, respectively. Applied to the non-negated input terminals of the operational amplifiers 44s and 44n are a predetermined bias voltage VB which defines an operation potential of the horizontal signal lines 40s and 40n. The output circuits 43s and 43n are formed from the operational amplifiers 44s and 44n, detection capacitors 45s and 45n connected between the negated input terminals and output terminals of the operational amplifiers 44s and 44n, and reset switches 46s and 46n formed from MOS transistors connected in parallel to the detection capacitors 45s and 45n, respectively.

In the output circuits 43s and 43n, a reset pulse φR is applied to the gate electrodes of the reset switches 46s and 46n. Output signals of the output circuits 43s and 43n are used as two inputs to a differential amplifier (operational amplifier) 47, and a finite difference between them is calculated by the differential amplifier 48. The finite difference signal is let out as an output signal OUT to the outside.

In the amplification type solid state imaging device of the construction described above, in an ordinary imaging operation, pixel signals prior to pixel resetting outputted to the vertical signal lines 33 are held by the first capacitors 38s as the operation pulse φOPS applied to the gate electrodes of the first operation switches 37s rises so that the operation switches 37s are put into a connecting state, and further, pixel signals after pixel resetting outputted to the vertical signal lines 33 are held by the second capacitors 38n as the operation pulse φOPN applied to the gate electrodes of the second operation switches 37n rises so that the operation switches 37n are put into a connecting state.

Then, the pixel signals prior to pixel resetting and after pixel resetting are outputted from the output circuits 43s and 43n through the horizontal signal lines 40s and 40n as a horizontal scanning pulse signal φH (φH1, . . . , φHn, φHn+1, . . . ) outputted from the horizontal shift register 41 in a horizontal image period is applied to the gate electrodes of the first and second horizontal switches 39s and 39n so that the horizontal switches 39s and 39n are put into a connecting state, and a finite difference between then is calculated by the differential amplifier 47. As a result, a video signal from which fixed pattern noises arising from dispersions of surface potentials of the pixels or the like have been removed is obtained.

In this manner, an amplification type solid state imaging device which is constructed so as to remove fixed pattern noises originating from dispersions of surface potentials of the pixels or the like, in the present embodiment, is characterized in that it can effect also removal of vertical string-like fixed pattern noises which arise from dispersions in threshold voltage Vth of the operation switches 37s and 37n or the horizontal switches 39s and 39n of the horizontal scanning circuit 36 separately from fixed pattern noises which arise from the pixels.

More particularly, in order to obtain a reference signal to be used to remove vertical string-like fixed pattern noises, while, in an ordinary imaging operation, pixel signals prior to pixel resetting are held by the first capacitors 38s, also signals after pixel resetting are held also by the capacitors 38s similarly to the second capacitors 38n, and same signals after pixel resetting are outputted from the output circuits 43s and 43n so that only vertical string-like fixed pattern noise components are outputted.

Figure 4:
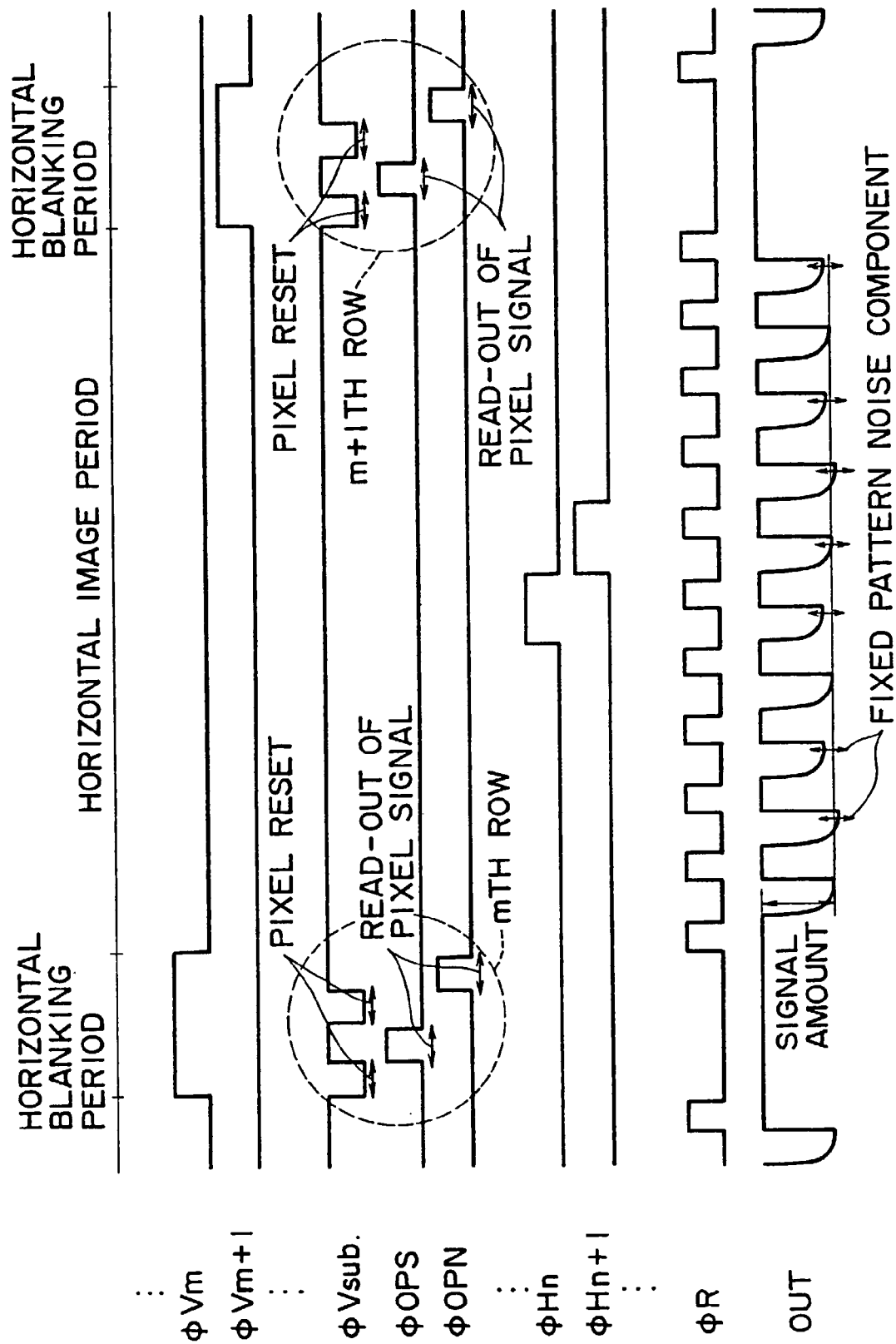
FIG. 4 is a timing chart illustrating operation of the solid state imaging device of FIG. 3.

In the following, circuit operation for outputting only vertical string-like fixed pattern noise components is described with reference to a timing chart of FIG. 4. Such operation is performed in a initial stage after a power supply to the device is made available.

The pixels in the mth row which is selected in a certain horizontal blanking period as a vertical scanning pulse φVm of vertical scanning pulse signal φV (φV1, . . . , φVm, φVm+1, . . . ) from the vertical scanning circuit 35 rises are reset as a substrate pulse φVsub. falls. Then, an operation pulse signal φOPS provided to the gate electrode of the operation switches 37s immediately rises so that the operation switches 37s are put into a connecting state, and consequently, signals after pixel resetting are held by the first capacitors 38s.

Further, in the same horizontal blanking period, for the same mth pixel rows, the substrate pulse φVsub. falls once again so that the pixels of the mth row are reset again. Then, the operation pulse signal φOPN provided to the gate electrodes of the second operation switches 37n immediately rises so that the operation switches 37n are put into a connecting state, and consequently, signals after pixel resetting are held by the second capacitors 38n.

The same signals after pixel resetting held by the first and second capacitors 38s and 38n are outputted as signals which include only vertical string-like fixed pattern noise components arising from the separate horizontal switches or the like from the output circuits 43s and 43n through the horizontal signal lines 40s and 40n, respectively, as a horizontal scanning pulse signal φH (φH1, . . . , φHn, φHn+1, . . . ) outputted from the horizontal shift register 41 in a horizontal image period is applied to the gate electrodes of the first and second horizontal switches 39s and 39n so that the horizontal switches 39s and 39n are put into a connecting state.

As described above, in order to remove fixed pattern noises arising from dispersions of surface potentials of the pixels or the like, also in an amplification type solid state imaging device of the construction which outputs, in an ordinary imaging operation, two pixel signals prior to pixel resetting and after pixel resetting, by reading out, when a power supply to the device is made available, signals after pixel resetting into the first capacitors 38s after the pixels of a certain pixel row in a horizontal blanking period are reset, reading out signals after pixel resetting of the same pixel row into the second capacitors 38n after the pixels of the pixel row are reset similarly once again, successively outputting the two signals prior to pixel resetting and after pixel resetting for the individual columns from the first and second capacitors 38s and 38n in a horizontal image period and calculating a difference between them, only vertical string-like fixed pattern noise components can be obtained readily without being influenced by incident light or the like even if mechanical light interception means such as a shutter is not used.

Figure 5:
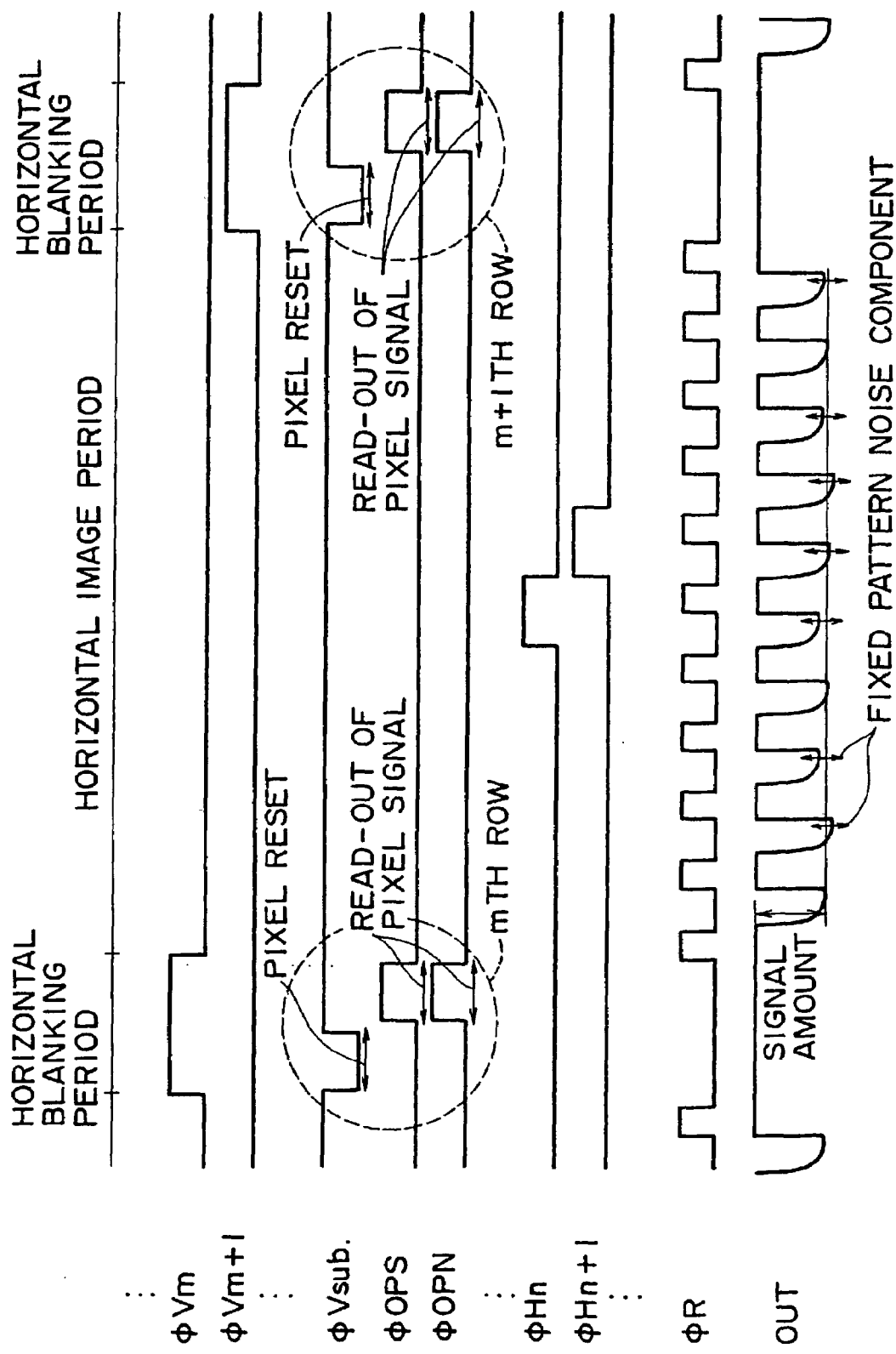
FIG. 5 is a timing chart illustrating operation of a modification to the solid state imaging device of FIG. 3.

FIG. 5 is a timing chart illustrating operation of a modification to the solid state imaging device of the second embodiment described above. Differences from the second embodiment are described briefly. While, in the second embodiment, pixel resetting is performed twice and pixel signals after the individual pixel resetting operations are read out at different timings and held by the first and second capacitors 38s and 38n, in the modified solid state imaging device, pixel resetting is performed once, and pixel signals after the pixel resetting are held simultaneously by the first and second capacitors 38s and 38n.

In particular, as apparent from the timing chart of FIG. 5, by outputting, after pixels are reset in a horizontal blanking period, an operation pulse φOPS and an operation pulse φOPN simultaneously and supplying them to the gates of the first and second operation switches 37s and 37n to put the operation switches 37s and 37n into a connecting state simultaneously, an operation of holding pixel signals after pixel resetting into the first and second capacitors 38s and 38n by one pixel resetting operation.

By reading out and holding pixel signals after same pixel resetting by a single time pixel resetting operation in this manner, while, in the second embodiment, a pixel resetting period is necessitated additionally in a horizontal blanking period comparing with that in an ordinary imaging operation, there is no necessity of providing an additional period for outputting only vertical string-like fixed pattern noise components in a horizontal blanking period, and a margin for operation does not decrease.

While, in the solid state imaging devices of the first and second embodiments described above, in an initial stage after a power supply to the device is made available, an operation mode for exclusive use to obtain a reference signal for cancellation of vertical string-like fixed pattern noises and, in this operation mode, a reference signal for cancellation of vertical string-like fixed pattern noises is obtained using signals of pixels in the effective pixel area, by using signals of pixels in a vertical OPB (optical black) region provided over several lines to several tens lines on one or each of the upper and lower sides of the effective pixel region formed from the light reception face by interception of light, a reference signal can be obtained on the real-time basis in a successively imaging condition.

Here, where a reference signal for cancellation of vertical string-like fixed pattern noises is obtained using signals of pixels in the vertical OPB region, an influence of a dark current component having a dispersion which is outputted from each pixel in the vertical OPB region. Particularly, since the vertical OPB region includes a comparatively small number of pixels, even if averaging processing is performed, a dark current component outputted from each pixel and having a dispersion cannot be suppressed sufficiently. In the following, solid state imaging devices of different embodiments wherein a reference signal for cancellation of vertical string-like fixed pattern noises is obtained using signals of pixels in the vertical OPB region are described.

Figure 6:
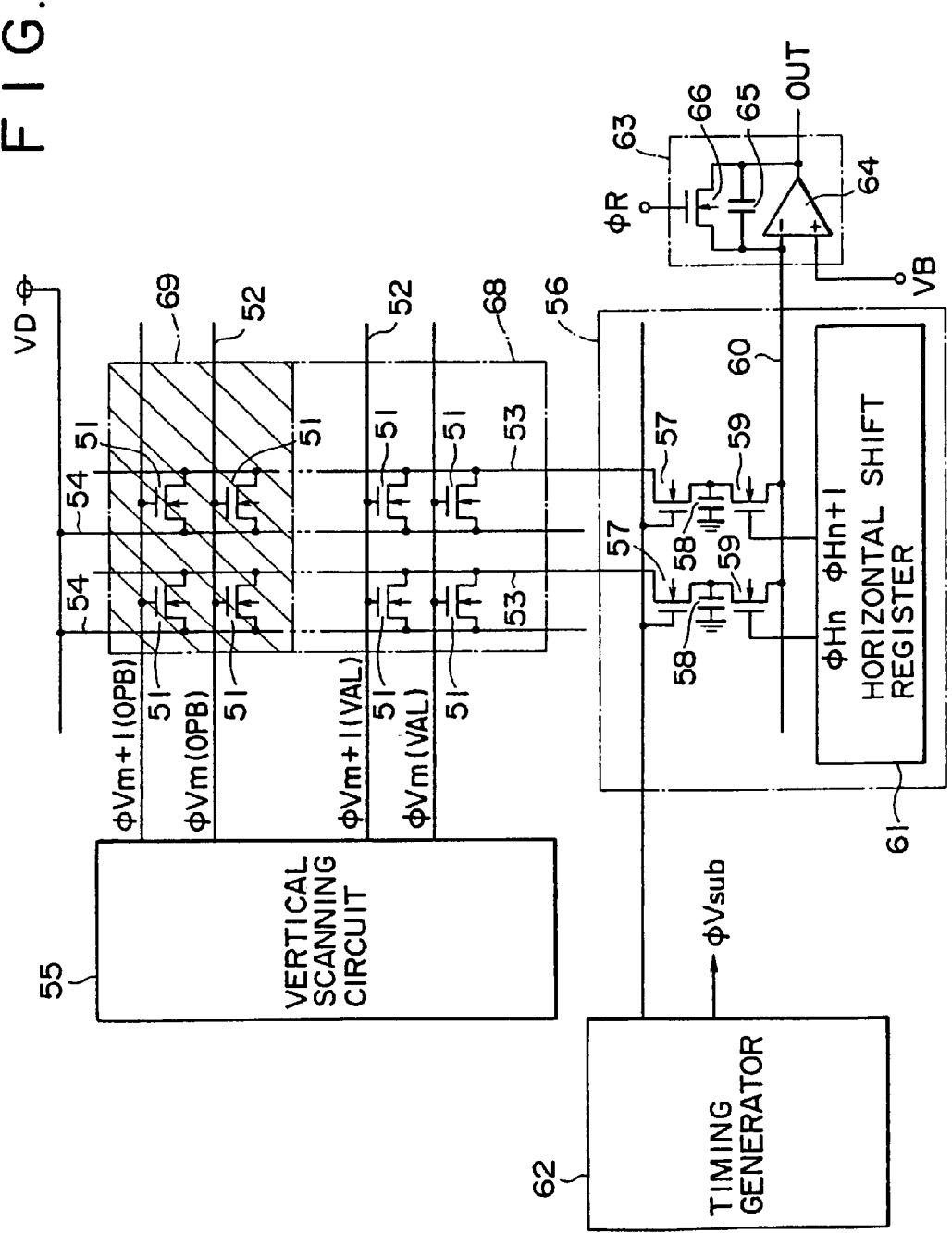
FIG. 6 is a schematic block diagram of a further amplification type solid state imaging device to which the present invention is applied.

FIG. 6 is a schematic block diagram showing a further amplification type solid state imaging device to which the present invention is applied. Referring to FIG. 6, a large number of pixel transistors 51 are arranged in rows and columns. Of the pixel transistors 51, the gate electrodes are connected in units of a row to vertical selection lines 52, the source electrodes are connected in units of a column to vertical signal lines 53, and the drain electrodes are connected to power supply lines 54 of a power supply voltage VD. A pixel section is formed from these elements.

This pixel section is divided into an effective pixel region 68 from which pixel signals to be actually used as an image signal are outputted, and a vertical OPB region 69 from which pixel signals to be used as a reference level for an image signal are outputted. In the vertical OPB region 69, light reception faces of the pixels are in a light intercepted condition from above by a light interception film (not shown). It is to be noted that, while, in the present solid state imaging device, the vertical OPB region 69 is provided only on the upper side of the effective pixel region 68 in FIG. 6, naturally it may otherwise be present only on the lower side in FIG. 6 or on both upper and lower sides of the effective pixel region 68.

In the pixel section, the vertical selection lines 52 are individually connected to output terminals of a vertical scanning circuit 55 for the individual rows. The vertical scanning circuit 55 is formed from a shift register or a like element and provides a vertical scanning (vertical selection) pulse signal $\phi V$ ($\phi V1, \ldots, \phi Vm, \phi Vm+1, \ldots$) to each of the vertical selection lines 52 in order to vertically scan to read out pixel signals for the individual rows. The vertical signal lines 53 are connected to a horizontal scanning circuit 56. The horizontal scanning circuit 56 includes operation switches 57 formed from MOS transistors, capacitors 58, horizontal switches 59 formed from MOS transistors, a horizontal signal line 60 and a horizontal shift register 61.

In the horizontal scanning circuit 56, an operation pulse signal $\phi OP$ outputted from a timing generator 62 is applied to the gate electrodes of the operation switches 57. The vertical signal lines 53 are connected to the drain electrodes of the operation switches 57, and one terminals of the capacitors 58 and the drain electrodes of the horizontal switches 59 are connected to the source electrodes of the operation switches 57. The other terminals of the capacitors 58 are grounded. The source electrodes of the horizontal switches 59 are connected to the horizontal signal line 60, and the gate electrodes of the horizontal switches 59 are connected to output terminals of the horizontal shift register 61 for the individual columns.

The horizontal shift register 61 provides a horizontal scanning pulse signal $\phi H$ ($\phi H1, \ldots, \phi Hn, \phi Hn+1, \ldots$) to each of the gate electrodes of the horizontal switches 59 in order to horizontally scan to read out pixel signals held by the capacitors 58 for the individual columns. The timing generator 62 generates various timing pulses including the operation pulse signal $\phi OP$ and generates a substrate pulse $\phi Vsub.$ for resetting the pixel transistors 51. The substrate pulse $\phi Vsub.$ is applied to a substrate to break potential barriers of the individual pixels on the substrate side to sweep out charge accumulated in the pixels to the substrate to effect pixel resetting.

The horizontal signal line 60 is connected to the negated input terminal of an operational amplifier 64 which forms an output circuit 63. Applied to the non-negated input terminal of the operational amplifier 64 is a predetermined bias voltage VB which defines an operation potential of the horizontal signal line 60. The output circuit 63 is formed from the operational amplifier 64, a detection capacitor 65 connected between the negated input terminal and an output terminal of the operational amplifier 64, and a reset switch 66 formed from a MOS transistor connected in parallel to the detection capacitor 65. A reset pulse $\phi R$ is applied to the gate electrode of the reset switch 66.

Subsequently, circuit operation of the amplification type solid state imaging device of the construction described above is described with reference to timing charts of FIGS. 7 and 8. It is to be noted that FIG. 7 illustrates timings and output waveforms in a vertical image period, and FIG. 8 shows timings and output waveforms in a vertical OPB period.

Figure 7:
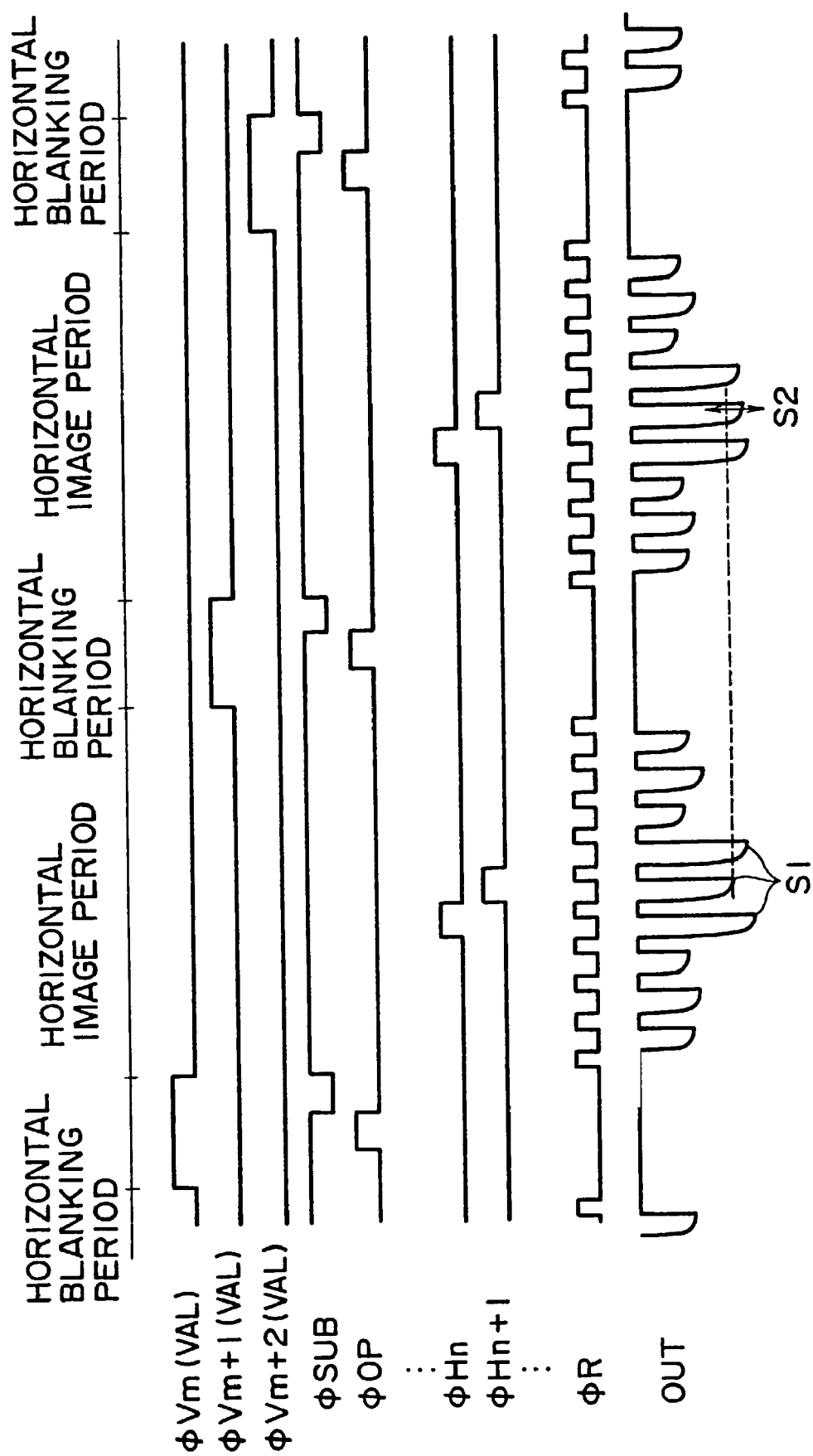
FIG. 7 is a timing chart illustrating operation of the solid state imaging device of FIG. 6 in a vertical image period.
Figure 8:
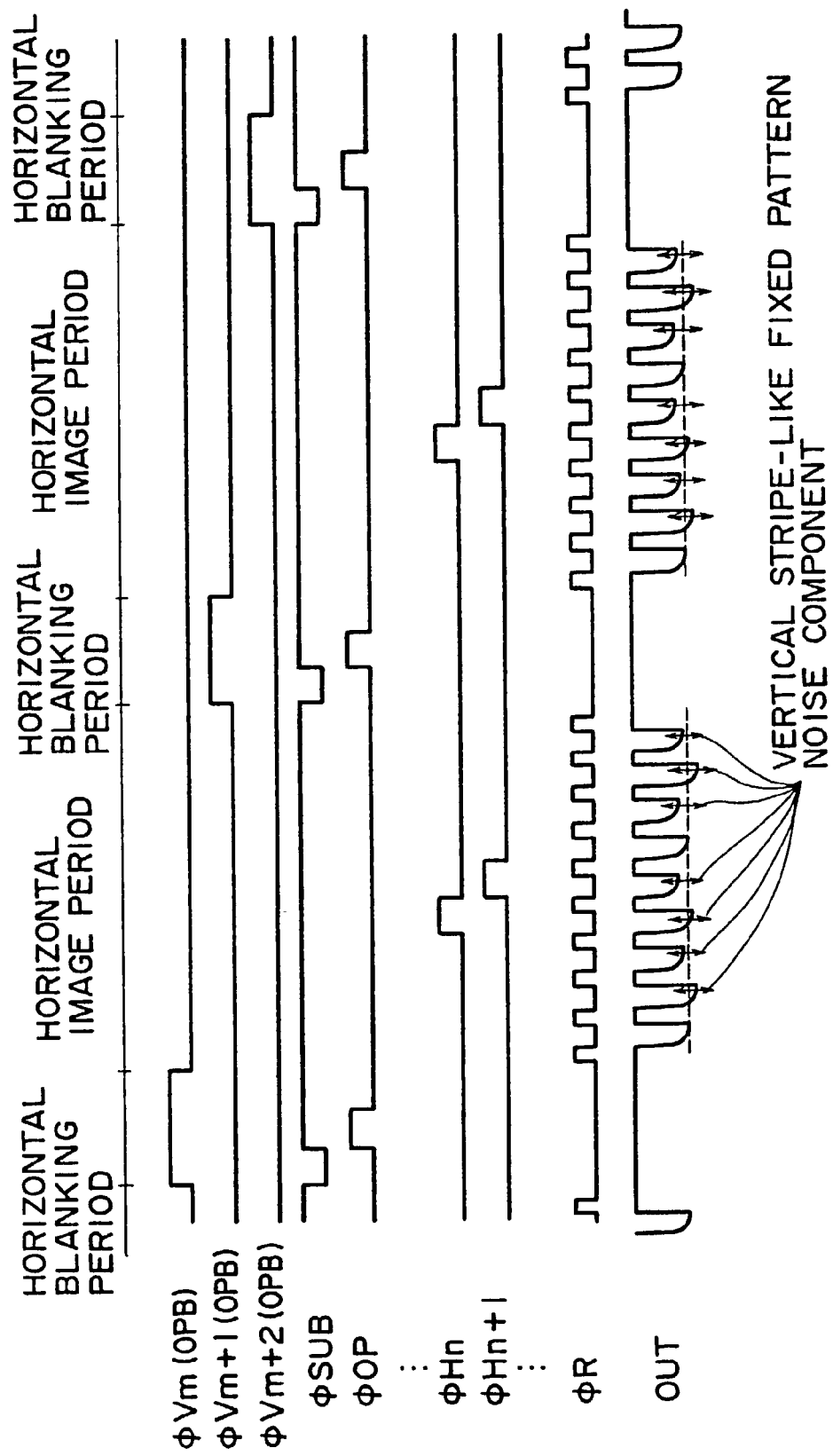
FIG. 8 is a timing chart illustrating operation of the solid state imaging device of FIG. 6 in a vertical OPB period.

First, in the vertical image period illustrated in FIG. 7, the pixels in the mth row in the vertical image period selected by a vertical scanning pulse signal $\phi V$ ($\ldots, \phi Vm(VAL), \phi Vm+1(VAL), \ldots$) outputted from the vertical scanning circuit 55 are put into an operative state in a horizontal blanking period. Then, pixel signals are read out through the operation switches 57 and held by the capacitors 58 as the operation pulse signal $\phi OP$ rises so that the operation switches 57 are put into a connecting state. As a substrate pulse $\phi SUB$ rises immediately, the pixels in the mth row for which reading out has been completed are reset.

When a horizontal image period is entered, the signals read out from the pixel transistors 51 and held in the capacitors 58 are sent from the horizontal signal line 60 to the output circuit 63 through the horizontal switches 59 as the horizontal switches 59 are successively put into a connecting state in response to a horizontal scanning pulse signal φH (φH1, ..., φHn, φHn+1, ...) outputted from the horizontal shift register 61 and are outputted as an output signal OUT.

In this instance, a pixel signal corresponding to an imaging object having a brightness appears as a signal S1 of a low level at the output signal OUT as apparently seen from the output waveform shown in FIG. 7. Further, if the pixels of the m+1th row include a pixel which produces higher dark current than the other pixels, then a dark current component signal S2 appears in addition to the signal of the imaging object.

On the other hand, in the vertical OPB period illustrated in FIG. 8, in order to use an output signal of the vertical OPB as a reference signal for cancellation of vertical string-like fixed pattern noises, it is necessary to remove generation of dark current component signals from pixels. To this end, pixels selected by the vertical scanning pulse signal φV are first reset prior to reading out, and then read out. As operation, the pixels of the mth row in a vertical OPB period selected by the vertical scanning pulse signal φV ( . . . , φVm(OPB), φVm+1(OPB), . . . ) outputted from the vertical scanning circuit 55 are put into an operative state in a horizontal blanking period.

Then, as the substrate pulse signal φSUB rises first, charge of dark current components remaining in the pixels are reset, and then the operation pulse signal φOP rises and the operation switches 57 are put into a connecting state. Consequently, signals from the pixels are outputted to the capacitors 58 through the operation switches 57. In this instance, the signals held by the capacitors 58 are signals of the pixels which do not include dark current component signals of the pixels.

Since, in a vertical OPB period, an operation for pixel resetting is performed immediately before pixel signals are read out and the pixel signals are read out immediately, an accurate reference signal for cancellation of vertical string-line fixed pattern noises arising from dispersions in threshold voltage Vth of the operation switches 57 and horizontal switches 59, which do not include dark current components of the pixels, can be obtained readily.

Figure 9:
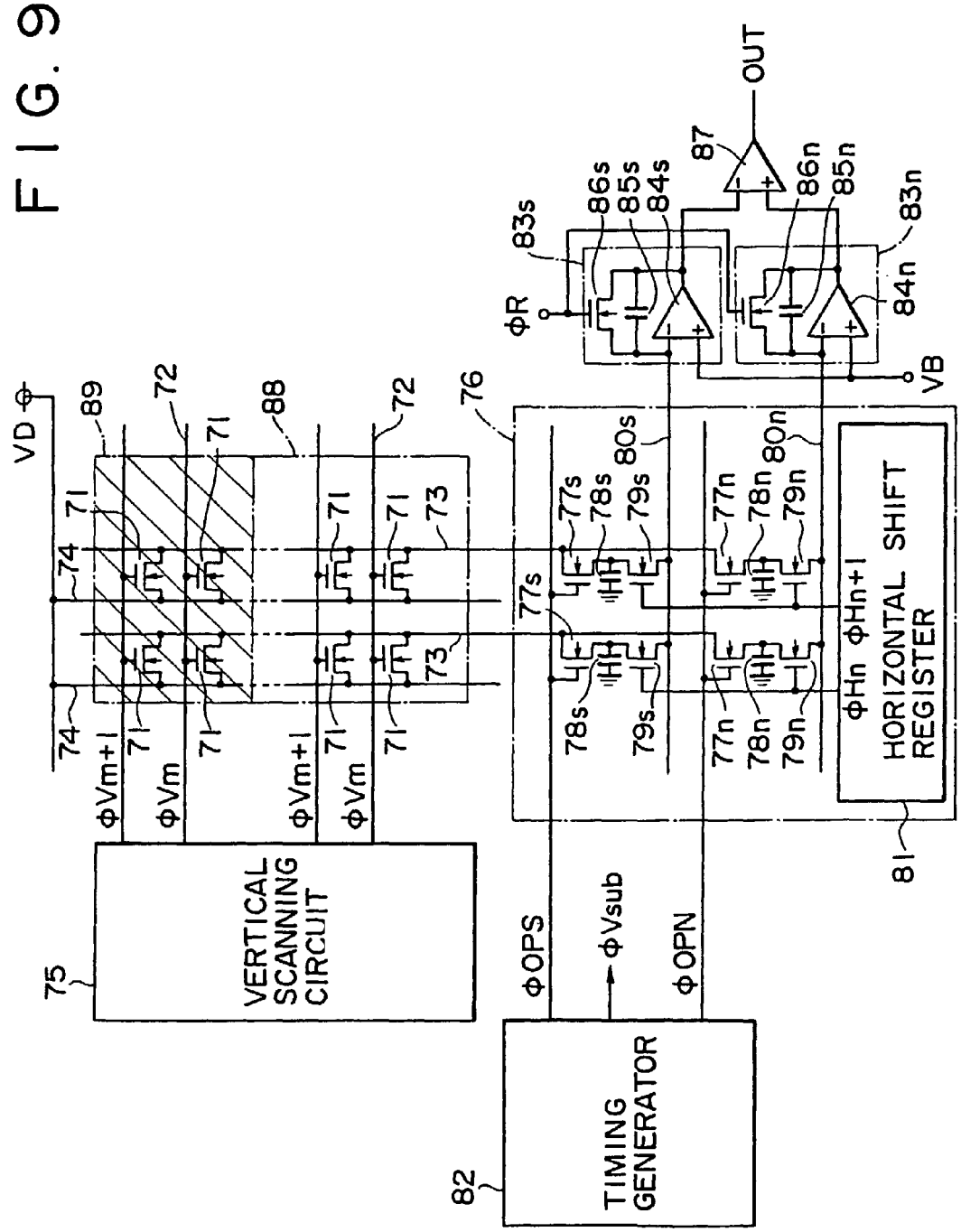
FIG. 9 is a schematic block diagram of a still further amplification type solid state imaging device to which the present invention is applied.

FIG. 9 is a schematic block diagram showing a still further amplification type solid state imaging device to which the present invention is applied. The amplification type solid state imaging device according to the present embodiment is generally constructed such that, similarly as in the case of the amplification type solid state imaging device according to the second embodiment, in order to remove fixed patter noises arising from dispersions of surface potentials of pixels or the like, two pixel signals prior to and after pixel resetting are outputted.

Referring to FIG. 9, a large number of pixel transistors 71 are arranged in rows and columns. Of the pixel transistors 71, the gate electrodes are connected in units of a row to vertical selection lines 72, the source electrodes are connected in units of a column to vertical signal lines 73, and the drain electrodes are connected to power supply lines 74 of a power supply voltage VD. A pixel section is formed from those elements.

This pixel section is divided into an effective pixel region 88 from which pixel signals to be actually used as an image signal are outputted, and a vertical OPB region 89 from which pixel signals to be used as a reference level for an image signal are outputted. In the vertical OPB region 89, light reception faces of the pixels are in a light intercepted condition from above by a light interception film (not shown). It is to be noted that, while in the present example, the vertical OPB region 89 is provided only on the upper side of the effective pixel region 88 in FIG. 9, naturally it may otherwise be present only on the lower side in FIG. 9 or on both upper and lower sides of the effective pixel region 88.

In the pixel section, the vertical selection lines 72 are individually connected to output terminals of a horizontal scanning circuit 75 for the individual rows. The horizontal scanning circuit 75 is formed from a shift register or a like element and provides a vertical scanning (vertical selection) pulse signal φV (φV1, ..., φVm, φVm+1, ...) to each of the vertical selection lines 72 in order to vertically scan to read out pixel signals for the individual rows. The vertical signal lines 73 are connected to a horizontal scanning circuit 76. The horizontal scanning circuit 76 includes first and second operation switches 77s and 77n formed from MOS transistors, first and second capacitors 78s and 78n, first and second horizontal switches 79s and 79n formed from MOS transistors, horizontal signal lines 80s and 80n and a horizontal shift register 81.

In the horizontal scanning circuit 76, operation pulse signals φOPS and φOPN outputted from a timing generator 82 are applied to the gate electrodes of the operation switches 77s and 77n. The vertical signal lines 73 are connected to the drain electrodes of the operation switches 77s and 77n, and terminals of the capacitors 78s and 78n and the drain electrodes of the horizontal switches 79s and 79n on one side are connected to the source electrodes of the operation switches 77s and 77n. The other terminals of the capacitors 78s and 78n are grounded. The source electrodes of the horizontal switches 79s and 79n are connected to the horizontal signal lines 80s and 80n, respectively, and the gate electrodes of the horizontal switches 79s and 79n are connected to output terminals of the horizontal shift register 81 for the individual columns.

The horizontal shift register 81 provides a horizontal scanning pulse signal φH (φH1, ..., φHn, φHn+1, ...) to each of the gate electrodes of the horizontal switches 79s and 79n in order to horizontally scan to read out pixel signals held by the capacitors 78s and 78n for the individual columns. The timing generator 82 generates various timing pulses including the operation pulse signals φOPS and φOPN and generates a substrate pulse φVsub. for resetting the pixel transistors 71. The substrate pulse φVsub. is applied to a substrate to break potential barriers of the individual pixels on the substrate side to sweep out charge accumulated in the pixels to the substrate to effect pixel resetting.

The horizontal signal lines 80s and 80n are connected to the negated input terminals of operational amplifiers 84s and 84n which form output circuits 83s and 83n, respectively. Applied to the non-negated input terminals of the operational amplifiers 84s and 84n are a predetermined bias voltage VB which defines an operation potential of the horizontal signal lines 80s and 80n. The output circuits 83s and 83n are formed from the operational amplifiers 84s and 84n, detection capacitors 85s and 85n connected between the negated input terminals and output terminals of the operational amplifiers 84s and 84n, and reset switches 86s and 86n formed from MOS transistors connected in parallel to the detection capacitors 85s and 85n, respectively.

In those output circuits 83s and 83n, a reset pulse φR is applied to the gate electrodes of the reset switches 86s and 86n. Output signals of the output circuits 83s and 83n are used as two inputs to a differential amplifier (operational amplifier) 87, and a finite difference between them is calculated by the differential amplifier 87. The finite difference signal is led out as an output signal OUT to the outside.

Subsequently, circuit operation of the amplification type solid state imaging device of the construction described above is described with reference to timing charts of FIGS. 10 and 11. It is to be noted that FIG. 10 illustrates timings and output waveforms in a vertical image period, and FIG. 11 shows timings and output waveforms in a vertical OPB period.

Figure 10:
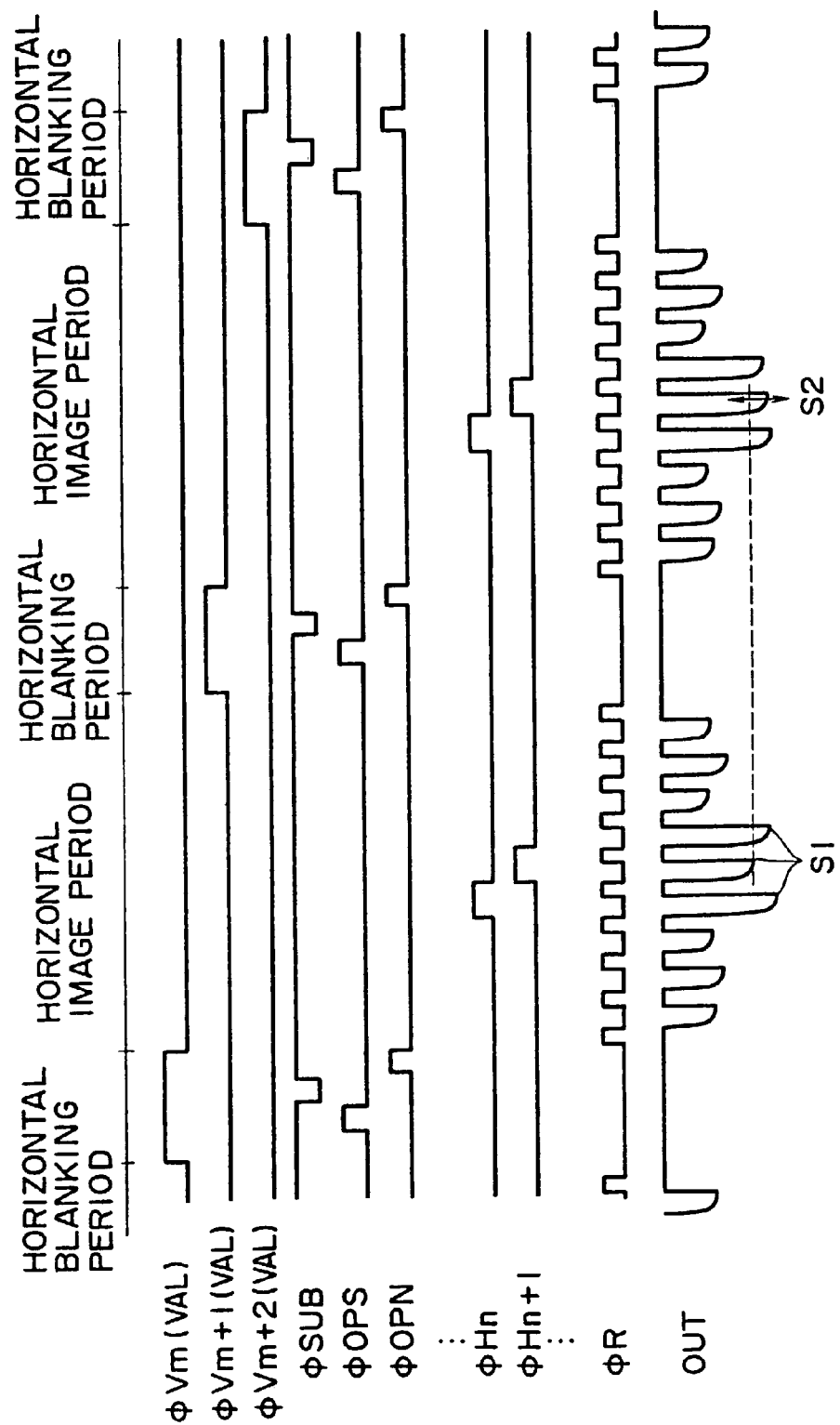
FIG. 10 is a timing chart illustrating operation of the solid state imaging device of FIG. 9 in a vertical image period.

In the vertical image period illustrated in FIG. 10, in order to read out signals prior to pixel resetting and signals after pixel resetting into the separate capacitors 78s and 78n, an operation pulse signal φOPS is first applied to the gate electrodes of the operation switches 77s in a horizontal blanking period so that the operation switches 77s are put into a connecting state. Consequently, signals prior to resetting of the pixels selected by the vertical scanning pulse signal φV are read out into the capacitors 78s, and then, the selected pixels are reset as a substrate pulse φSUB falls. Thereafter, an operation pulse φOPN is applied to the gate electrodes of the operation switches 77s so that the operation switches 77s are put into a connecting state. Consequently, signals after resetting of the selected pixels are read out into the capacitors 78n.

The signals prior to and after resetting of the pixels read out into the capacitors 78s and 78n are supplied to the output circuits 83s and 83n through the horizontal signal lines 80s and 80n, respectively, as the horizontal switches 79s and 79n controlled by a horizontal scanning pulse signal φH outputted from the horizontal shift register 81 in a horizontal image period are successively put into a connecting state, and are led out as a signal output OUT from which fixed pattern noises arising from the pixels have been removed from the differential amplifier 87.

Figure 11:
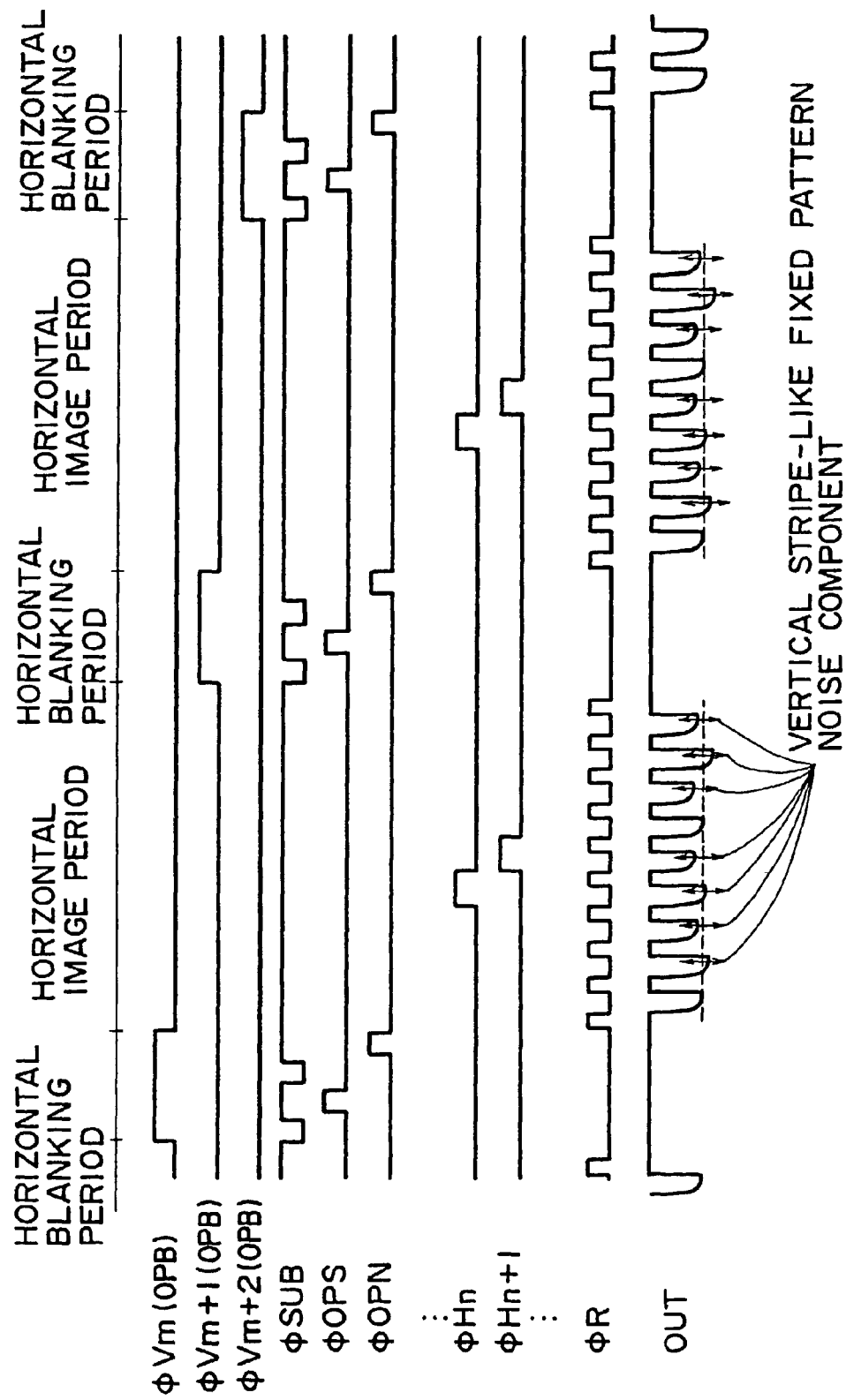
FIG. 11 is a timing chart illustrating operation of the solid state imaging device of FIG. 9 in a vertical OPB period.
Figure 14:
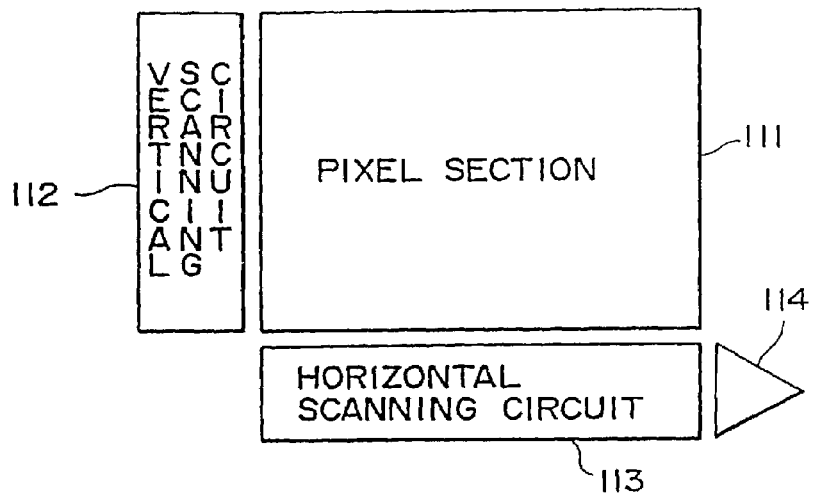
FIG. 14 is a schematic block diagram of an X-Y address type solid state imaging device.
Figure 15:
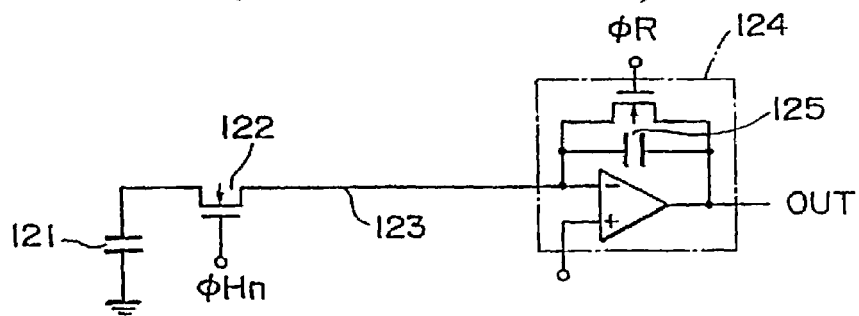
FIG. 15 is an equivalent circuit diagram of a signal path of a horizontal scanning circuit in the solid state imaging device of FIG. 14.
Figure 16A:
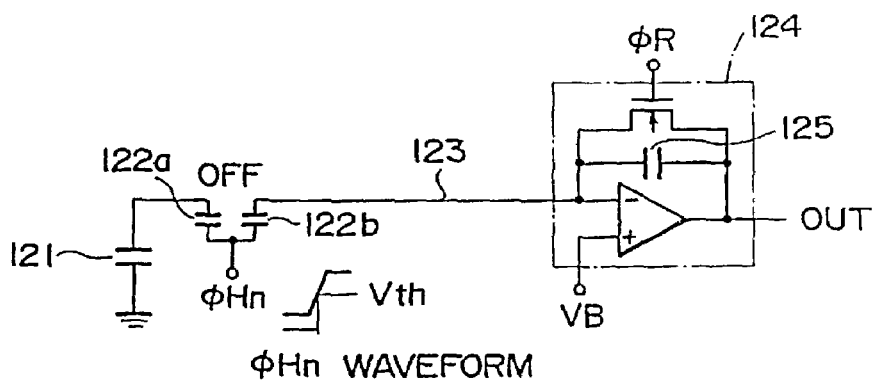
FIGS. 16A and 16B are equivalent circuit diagrams of the signal path of FIG. 15 where a horizontal switch is replaced by a capacitance model.
Figure 16B:
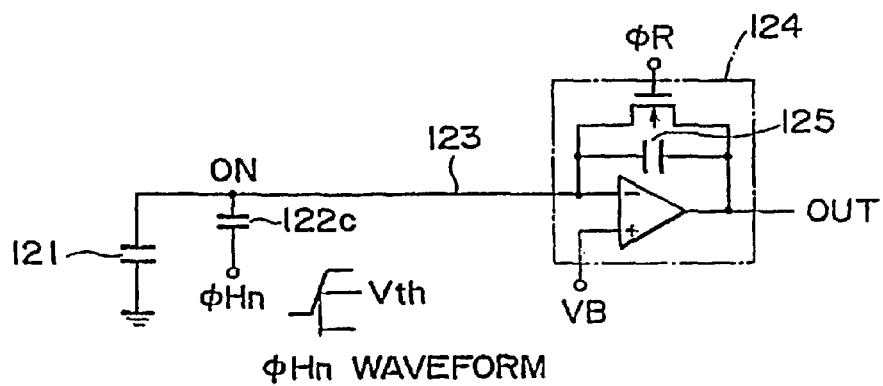
Figure 17:
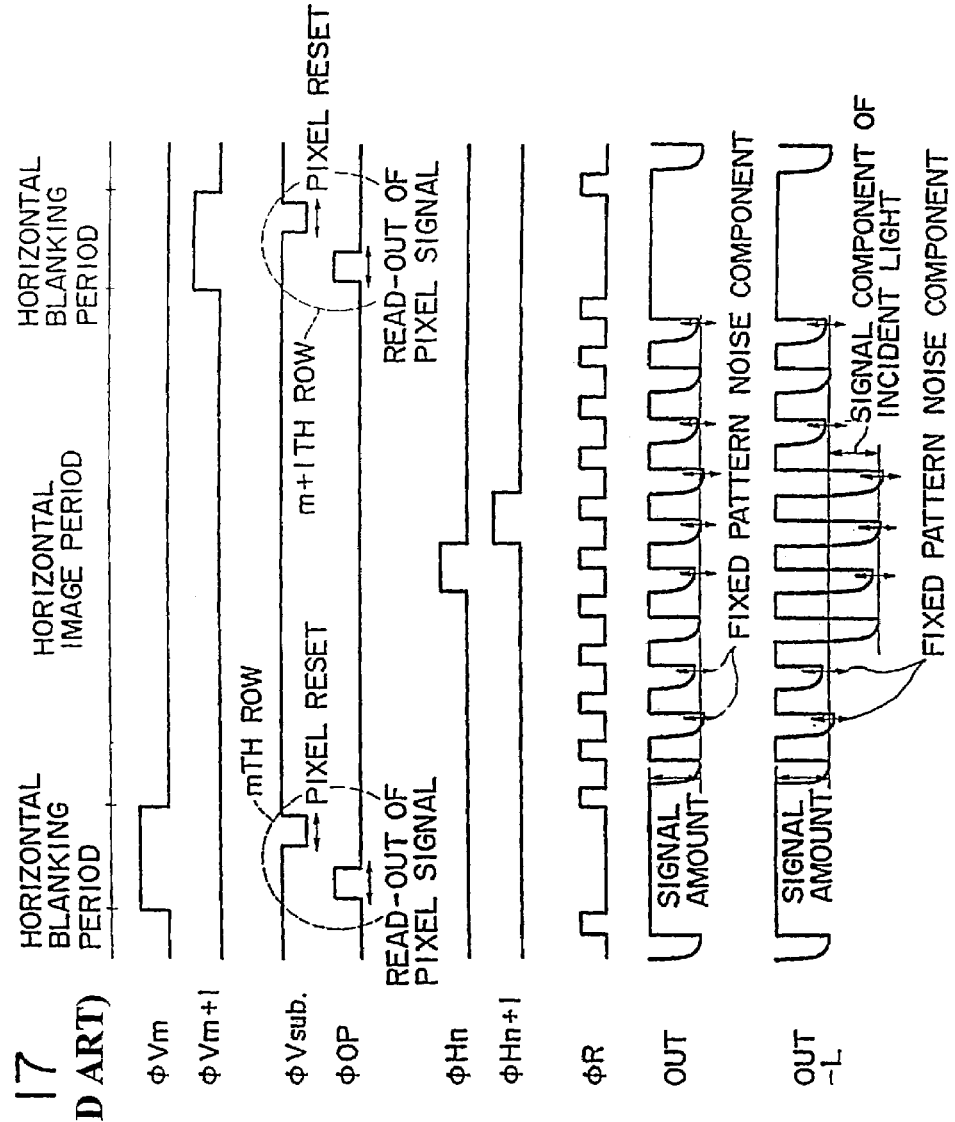
FIG. 17 is a timing chart illustrating operation of the solid state imaging device of FIG. 14 and illustrating a subject to be solved.

On the other hand, in the vertical OPB period illustrated in FIG. 11, in order to prevent dark current components of the pixels to be superposed on pixel signals of a vertical OPB region 89, different from the operation in the vertical image period described above, a resetting operation of charge arising from dark current of the pixels selected by a vertical scanning pulse signal φV is first performed in a horizontal blanking period. In particular, as the substrate pulse φSUB falls, a resetting operation of the selected pixels is performed, and immediately, the operation pulse φOPS applied to the gate electrodes of the first operation switches 77s rises so that the operation switches 77s are put into a connecting state. Consequently, signals after pixel resetting are held by the first capacitors 78s.

Further, for the same pixel row in the same horizontal blanking period, the substrate pulse φVsub. falls again so that the pixels are reset again. Then, immediately after this, the operation pulse φOPN applied to the gate electrodes of the second operation switches 77n rises so that the operation switches 77n are put into a connecting state. Consequently, signals after pixel resetting are held by the capacitors 78n. In a horizontal image period, by the same operation as that in the vertical image period described hereinabove, signals of vertical string-like fixed pattern noises arising only from dispersions of the elements from the operation switches 77s and 77n and the horizontal switches 79s and 79n, which do not include dark current component signals in the vertical OPB period, are outputted.

Also in an amplification type sold state imaging device of the construction wherein two pixel signals prior to pixel resetting and after pixel resetting are outputted in an ordinary imaging operation in order to remove fixed pattern noises arising from dispersions of surface potentials of pixels or the like, by resetting, in a vertical OPB period, pixels of a certain pixel row in a horizontal blanking period, reading out signals after the pixel resetting into the first capacitors 78s, resetting the pixels of the same pixel row again in a similar manner, and reading out signals after pixel resetting into the second capacitors 78n and then successively outputting, in a horizontal image period, the two signals prior to pixel resetting and after pixel resetting from the first and second capacitors 78s and 78n for the individual columns and calculating finite differences of the individual signals, an accurate reference signal for cancellation of vertical string-like fixed pattern noises arising from dispersions in threshold voltage Vth of the operation switches 77s and 77n and the horizontal switches 79s and 79n, which do not include dark current components of the pixels, can be obtained readily.

It is to be noted that also the solid state imaging device of the fourth embodiment can be modified as a modification wherein pixel resetting is performed once and pixel signals after the pixel resetting are held into the first and second capacitors 78s and 78n simultaneously, as in the case of the modification to the second embodiment. According to the modified solid state imaging device, while, in the fourth embodiment, a pixel resetting period is necessitated additionally in a horizontal blanking period comparing with that in an ordinary imaging operation, there is no necessity of providing an additional period for outputting only vertical string-like fixed pattern noise components in a horizontal blanking period, and a margin for operation does not decrease.

FIG. 12 is a block diagram showing an example of a signal processing circuit in the amplification type solid state imaging devices according to any of the first to fourth embodiments wherein vertical string-like fixed pattern noises are canceled based on a reference signal obtained by an operation of outputting only vertical string-like fixed pattern noise components.

Referring to FIG. 12, a reference signal outputted from an amplification type solid state imaging device 91 according to any of the first to fourth embodiments is used as one of inputs to an adder 92. An analog output signal of the adder 92 is first amplified by an amplifier 93 and then converted into a digital signal by an AD converter 94. The digital reference signal for vertical string-like fixed pattern noises obtained here is written into a line memory 96 through a DSP (Digital Signal Processor) 95. Data written in the line memory 96 is converted into an analog signal by a DA converter 97 and used as the other input to the adder 92.

In the signal processing circuit of the construction described above, a reference signal for cancellation of vertical string-like fixed pattern noises arising from a horizontal scanning circuit is obtained from the amplification type solid state imaging device 91, and the reference signal is amplified by the amplifier 93, whereafter it is converted into a digital signal by the AD converter 94. This digital signal is written into the line memory 96 through the DSP 95 and the value thereof is inputted to the adder 92 through the DA converter 97 to perform rough cancellation of vertical string-like fixed pattern noises.

The corrected signal is amplified again by the amplifier 93 and converted into a digital signal by the AD converter 94, and then averaging value processing and so forth of the digital signal with the value written in the line memory 96 formerly is performed to produce a correction signal having a higher degree of accuracy and the correction signal is written into the line memory 96. The thus written value is inputted to the adder 92 through the DA converter 97 thereby to effect cancellation processing of removing vertical string-like fixed pattern noises from the output of the imaging device 91. By repetition of such processing, the accuracy of the correction signal is raised and vertical string-like fixed pattern noises are canceled to such a degree that they can be ignored.

FIG. 13 is a schematic block diagram of a camera to which the present invention is applied. Referring to FIG. 13, light from an imaging object passes an optical system such as a lens 101 and enters an imaging area of an imaging device 102. For the imaging device 102, the amplification type solid state imaging device according to any one of the first to fourth embodiments which can output only vertical string-like fixed pattern noise components is used. The imaging device 102 is driven by a driver circuit 103.

An output signal of the imaging device 102 is subject to signal processing such as cancellation of vertical string-like fixed pattern noises in a signal processing circuit 104. For a part of the signal processing circuit 104, the signal processing circuit for canceling vertical string-like fixed pattern noises shown in FIG. 12 is used. The driver circuit 103 and the signal processing circuit 104 of the imaging device 102 are controlled by a system controller 105.

Here, where the amplification type solid state imaging device according to the first or second embodiment is used as the imaging device 102, cancellation processing of vertical string-like fixed pattern noises using all pixels (the full angle of view) of the effective pixel area is performed. Accordingly, since correction of a high degree of accuracy can be realized, the imaging device 102 is useful for a still camera and so forth. Further, by setting a period in which vertical string-like fixed pattern noises are to be canceled in an initial stage after a power supply is made available, correction values are refreshed each time a power supply is made available, and cancellation of vertical string-like fixed pattern noises which is not influenced by a small secular change of the solid state imaging device is allowed.

Meanwhile, where the amplification type solid state imaging device according to the third or fourth embodiment is used as the imaging device 102, since the number of pixels in the vertical OPB region are small, the accuracy is lower than that where the amplification type solid state imaging device of the first or second embodiment is used. However, since correction processing is performed on the real time basis, the amplification type solid state imaging device can cope with a time/temperature drift of the temperature of the imaging device or the characteristic of the processing circuit after starting imaging, and consequently, it is useful for a monitor camera and so forth.

Figure 18:
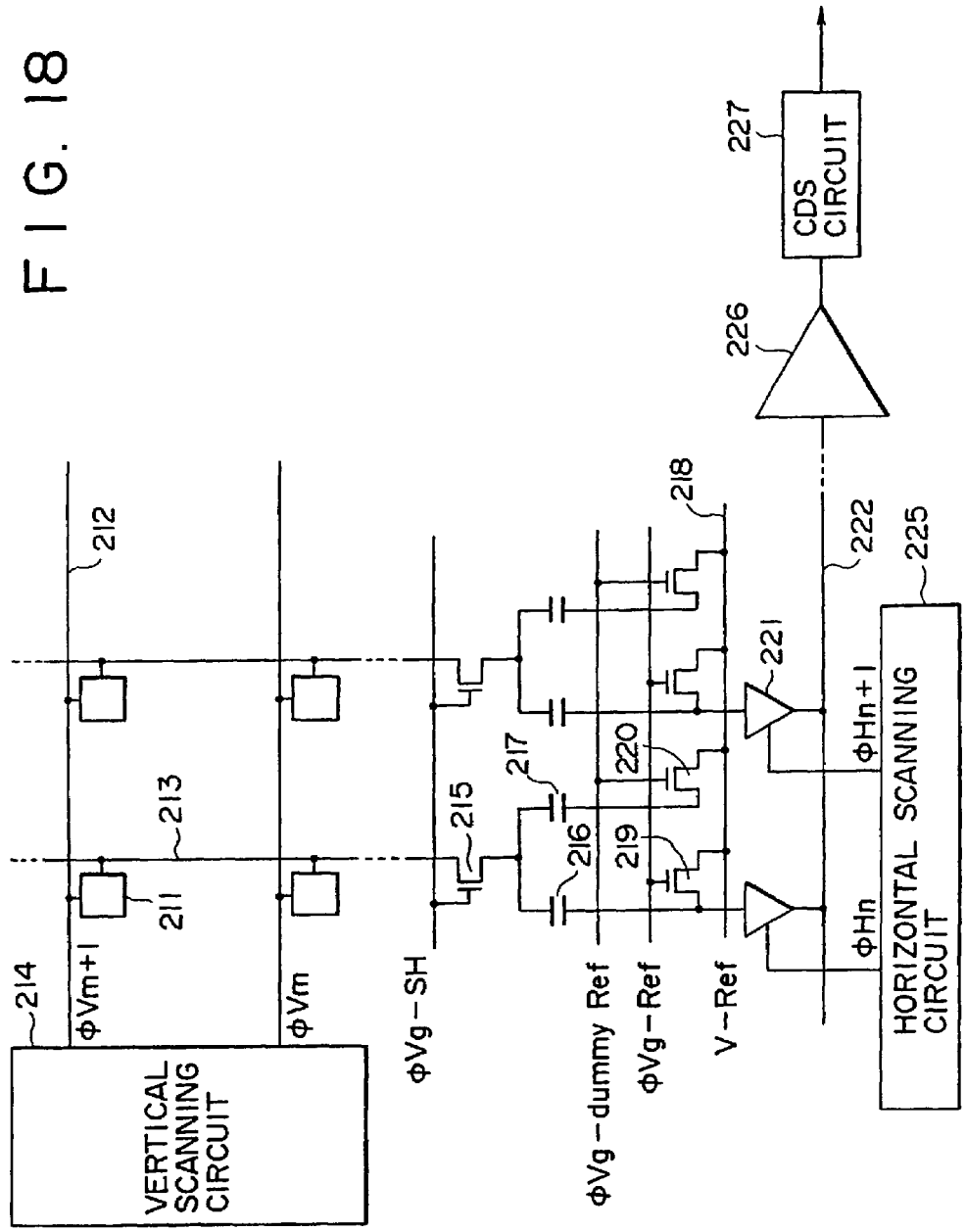
FIG. 18 is a schematic block diagram of a yet further solid state imaging device to which the present invention is applied.

FIG. 18 is a schematic block diagram showing a yet further solid state imaging device to which the present invention is applied. Referring to FIG. 18, a large number of pixels 211 are arranged in rows and columns, and control input terminals of the pixels 211 are individually connected to vertical selection lines 212 in units of a row while output terminals of the pixels 211 are individually connected to vertical signal lines 213 in units of a column. From the pixels 211, signals are outputted as voltages to the vertical signal lines 213. Terminals of the vertical selection lines 212 on one side are connected to output terminals of a vertical scanning circuit 214 for the individual rows. The vertical scanning circuit 214 is formed from a shift register or a like element and successively outputs a vertical scanning pulse signal φV (φV1, . . . , 100 Vm, φVm+1, . . . ).

Connected to each of the vertical signal lines 213 is the drain of a sampling switch (first switch means) 215 formed from an Nch MOS transistor. A sampling pulse signal φPg-SH for reading out a signal voltage in a bright state prior to pixel resetting and a signal voltage in a dark state obtained by resetting a pixel 211 or the like (the latter signal voltage is hereinafter referred to as signal voltage in a dark state after pixel resetting) from a pixel 211 is applied to the gate of the sampling switch 215. Connected to the source of the sampling switch 215 are terminals of a load capacitor (first storage means) 216 and a dummy capacitor (second storage means) 217 on one side.

A reference switch (second switch means) 219 formed from a MOS transistor is connected between the other terminal of the load capacitor 216 and a reference potential line 218 which provides a reference potential V-Ref. similarly, a dummy reference switch (second switch means) 220 formed from a MOS transistor is connected between the dummy capacitor 217 and the reference potential line 218. A reference pulse signal φVg-Ref is applied to the gate of the reference switch 219 while a dummy reference pulse signal φVg-dumy Ref is applied to the gate of the dummy reference switch 220.

Figure 19:
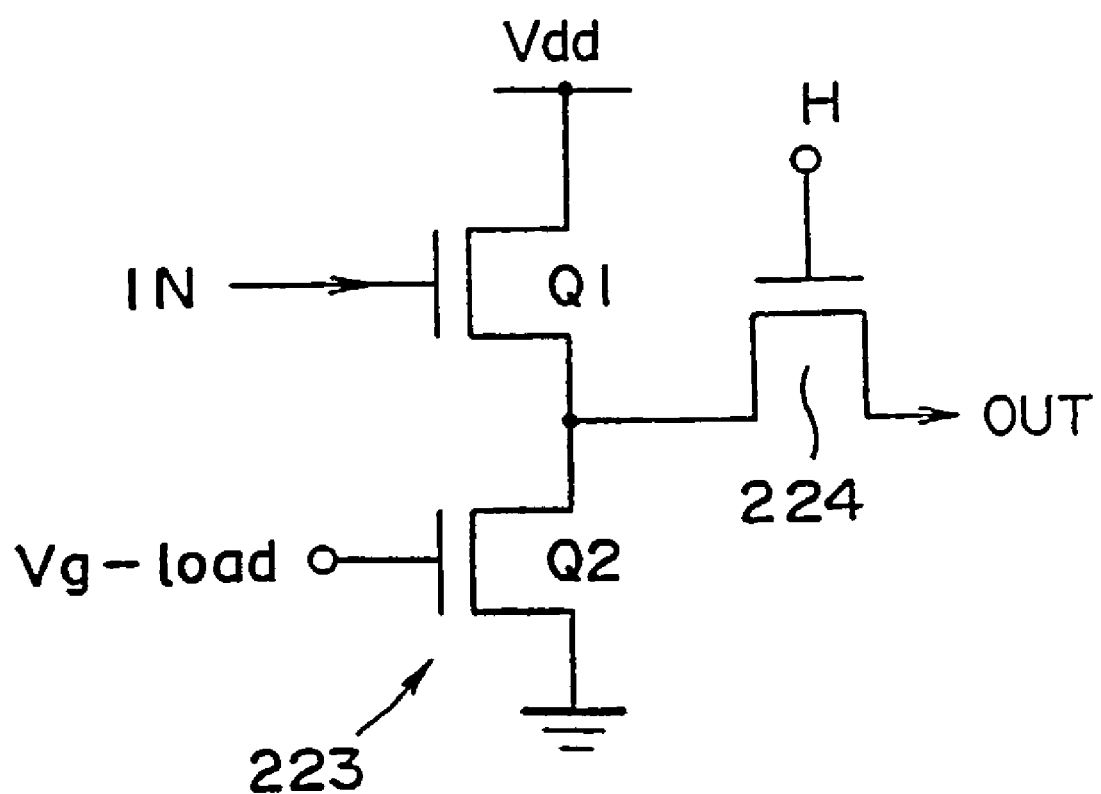
FIG. 19 is a circuit diagram showing an example of a construction of a vertical output circuit of the solid state imaging device of FIG. 18.

Further, an input terminal of a vertical output circuit 221 is connected to the other terminal of the load capacitor 216. An output terminal of the vertical output circuit 221 is connected to a horizontal signal line 222. The vertical output circuit 221 is composed of, for example, as shown in FIG. 19, a source follower circuit 223 including a drive MOS transistor Q1 and a load MOS transistor Q2 connected in series between a power supply Vdd and the ground, and a horizontal selection switch 224 formed from a MOS transistor connected between the source of the drive MOS transistor Q1 and the horizontal signal line 222. In the source follower circuit 223, a predetermined bias voltage Vg-load is applied to the gate of the load MOS transistor Q2.

The gate of this horizontal selection switch 224 is connected to an output terminal of a horizontal scanning circuit 225 for each column. The horizontal scanning circuit 225 is formed from a shift register and outputs a horizontal scanning pulse signal φH ( . . . , φHn, φHn+1, . . . ) for successively turning on the horizontal selection switches 224. The horizontal signal line 222 is connected to an input terminal of a horizontal output circuit 226. An output terminal of the horizontal output circuit 226 is connected to an input terminal of a CDS circuit (correlation double sampling) 227.

Subsequently, a driving method for the amplification type solid station imaging device according to the present embodiment having the construction described above for removing vertical string-like fixed pattern noises arising from dispersions in characteristic of the pixels 211 and vertical string-like fixed pattern noises arising from dispersions of circuits is described.

First, operation (t1 to t6) until signal voltages are sample held is described with reference to FIG. 21.

In a horizontal blanking period, first at the point t1 of time, the sampling pulse signal φVg-SH changes to the "H" level and the sampling switch 215 is put into an on-state. Consequently, a signal voltage Vsigl in a bright state prior to pixel resetting is sampled. In this instance, since the reference pulse signal φVg-Ref has the "H" level and the reference switch 219 is in an on-state, the output side potential of the load capacitor 216 is the reference potential V-Ref.

Then, at the point t2 of time, the sampling pulse signal φVg-SH changes to the "L" level and the sampling switch 215 is put into an off-state, and consequently, the signal voltage Vsigl in a dark state is held by the load capacitor 216. In this instance, a noise component Vα produced by switching when the sampling switch (SH Tr) 215 is cut off is superposed on the load capacitor 216.

Then, at the point t3 of time, the reference pulse signal φVg-Ref changes to the "L" level, and in response to this, the reference switch 219 is put into an off-state. In this instance, since the sampling switch 215 is in an off-state, the input side of the load capacitor 216 is in an floating state, and consequently, a noise component Vβ caused by switching when the reference switch (Ref Tr) 219 is cut off is not superposed on the load capacitor 216.

Then, after, at the point t4 of time, the dummy reference pulse signal φVg-dumy Ref changes to the "H" level and the dummy reference switch 220 is put into an on-state, at the point t5 of time, the sampling pulse signal φVg-SH changes to the "H" level again and the sampling switch 215 is put into an on-state. Consequently, a signal voltage vsigd in a dark state after pixel sampling is sampled.

Then, at the point t6 of time, the sampling pulse signal φVg-SH changes to the "L" level and the sampling switch 215 is put into an off-state, and consequently, the signal voltage vsigd in a dark state is held by the dummy capacitor 217. In this instance, since the dummy capacitor 217 is connected to the output side of the sampling switch 215, similarly as in the case wherein the signal voltage Vsigl in a bright state is held, a noise component Vα caused by the switching of the sampling switch 215 is superposed on the dummy capacitor 217.

In this manner, since the input sides of the load capacitor 216 and the dummy capacitor 217 are connected to the output terminal of the sampling switch 215 while the output sides of the capacitors 216 and 217 are connected to the reference potential line 218 by the reference switches 219 and 220 and the output side of the load capacitor 216 is connected to the input terminal of the vertical output circuit 221 and then they are driven by the procedure described above, a correlation double sampled signal voltage of (Vsigd−Vsigl+V-Ref) is led out from the output side of the load capacitor 216.

In other words, since a dummy circuit (the dummy capacitor 217 and the dummy reference switch 220) is provided in a symmetrical relationship to a circuit (the load capacitor 216 and the reference switch 219) which takes charge of a correlation double sampling operation) to effect correlation double sampling and a signal voltage Vsigl in a bright state and another signal voltage Vsigd in a dark state are read out along the same signal path, a signal voltage from which not only fixed pattern noises arising from a dispersion in characteristic of a pixel 211 but also noise components arising from a dispersion in characteristic of a circuit which makes a cause of vertical string-like fixed pattern noises, that is, caused by switching of the sampling switch 215, have been removed is obtained.

Subsequently, operation (t7 to t8) of outputting a signal voltage to the horizontal signal line 222 is described.

In a horizontal effective period, a horizontal scanning pulse signal φH ( . . . , φHn, φHn+1, . . . ) is successively outputted from the horizontal scanning circuit 225, and the horizontal selection switch 224 (refer to FIG. 19) in the vertical output circuit 221 in a certain column is put into an on-state at the point t7 of time. Consequently, a signal voltage (Vsigd−Vsigl+V-Ref) of the column is read out into the horizontal signal line 222 by the vertical output circuit 221.

Figure 20:
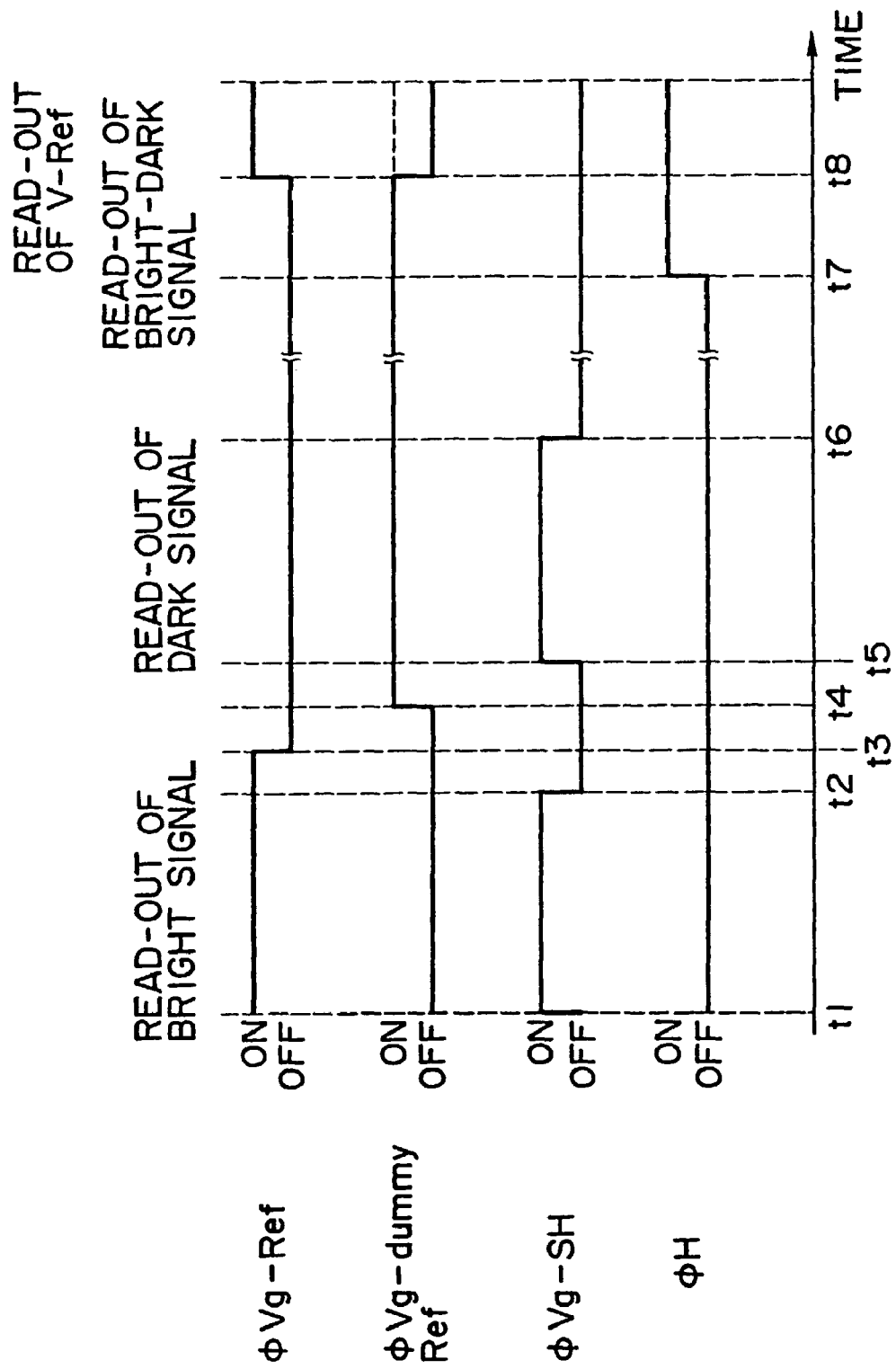
FIG. 20 is a timing chart illustrating operation of the solid state imaging device of FIG. 18.

Then, at the point t8 of time, the reference pulse signal φVg-Ref changes to the "H" level and the reference switch 219 is put into an on-state, and consequently, the reference potential V-Ref is read out to the horizontal signal line 222 by the vertical output circuit 221. Thereupon, the dummy reference pulse signal φVg-dumy Ref changes to the "L" level. However, the dummy reference pulse signal φVg-dumy Ref may otherwise maintain the "H" level as indicated by a broken line in FIG. 20.

When the signal voltage (Vsigd−Vsigl+V-Ref) and the reference potential V-Ref read out successively into the horizontal signal line 222 in this manner pass the vertical output circuit 221, noise components originating from an offset dispersion of the source follower circuit 223 (refer to FIG. 19) or caused by the switching of the horizontal selection switch 224 are superposed on them, and if they have dispersions between the columns, then they make vertical string-like fixed pattern noises.

However, the signal voltage (Vsigd−Vsigl+V-Ref) and the reference potential V-Ref successively read out into the horizontal signal line 222 are transmitted successively in units of a column on the time base by the horizontal signal line 222 and pass the horizontal output circuit 226, whereafter correlation double sampling of them is performed by the CDS circuit 227 to calculate a finite difference between them. Consequently, dispersions in characteristic of circuits between the columns of the vertical output circuit 221, which make a factor of vertical string-like fixed pattern noises can be removed.

By the construction described above, a signal from which not only fixed pattern noises arising from characteristic dispersions of the pixels 211 but also vertical string-like fixed pattern noises arising from characteristic dispersions of circuits such as noise components caused by switching of the sampling switches 215, offset dispersions of the source follower circuits 223 (refer to FIG. 19) or noise components caused by switching of the horizontal selection switches 224 have been removed is obtained.

Figure 24:
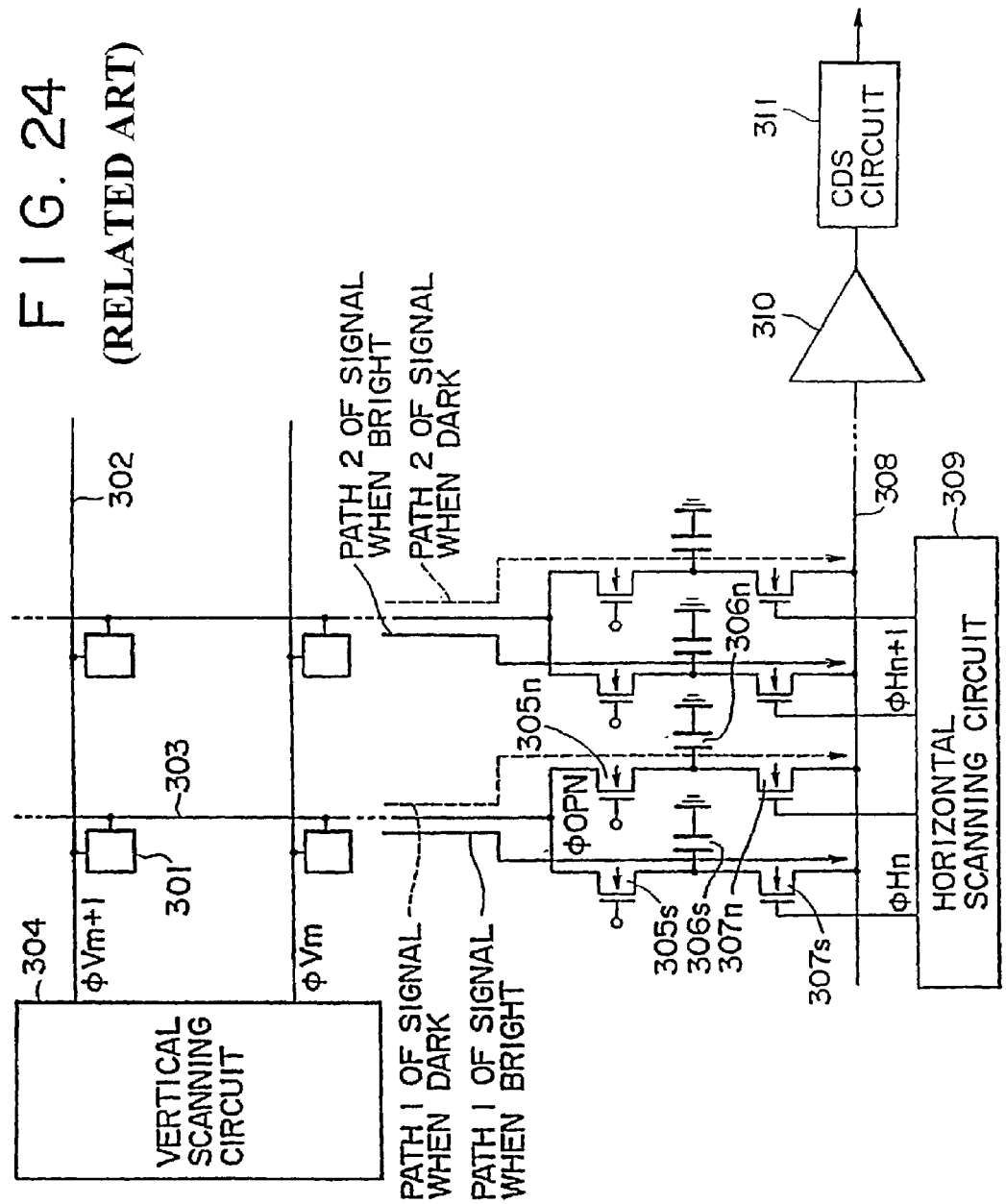
FIG. 24 is a schematic block diagram showing a ordinary solid state imaging device.

Further, in the conventional amplification type solid state imaging apparatus described hereinabove with reference to FIG. 24, since the signal voltages Vsigl in a bright state prior to pixel resetting and the signal voltages Vsigd in a dark state after pixel resetting are transmitted successively on the time base in units of a column, a time margin must be secured between the signal voltages Vsigl in a bright state and the signal voltages Vsigd in a dark state. As a result, a phase margin for a clock signal for the horizontal scanning circuit or the CDS circuit at the following stage cannot be secured sufficiently.

In contrast, with the amplification type solid state imaging device according to the present embodiment, since what follows the signal voltage (Vsigd−Vsigl+V-Ref) in units of a column on the time base is the reference potential V-Ref, after the signal voltage (Vsigd−Vsigl+V-Ref) is read out, the reference potential V-Ref can be read out, or in other words, there is no need of provision of a time margin between the signal voltage (Vsigd−Vsigl+V-Ref) and the reference potential V-Ref. Consequently, the amplification type solid state imaging device is advantageous also in that a phase margin for a clock signal for the horizontal scanning circuit 225 or the CDS circuit 227 can be secured sufficiently comparing with the conventional apparatus.

Figure 22:
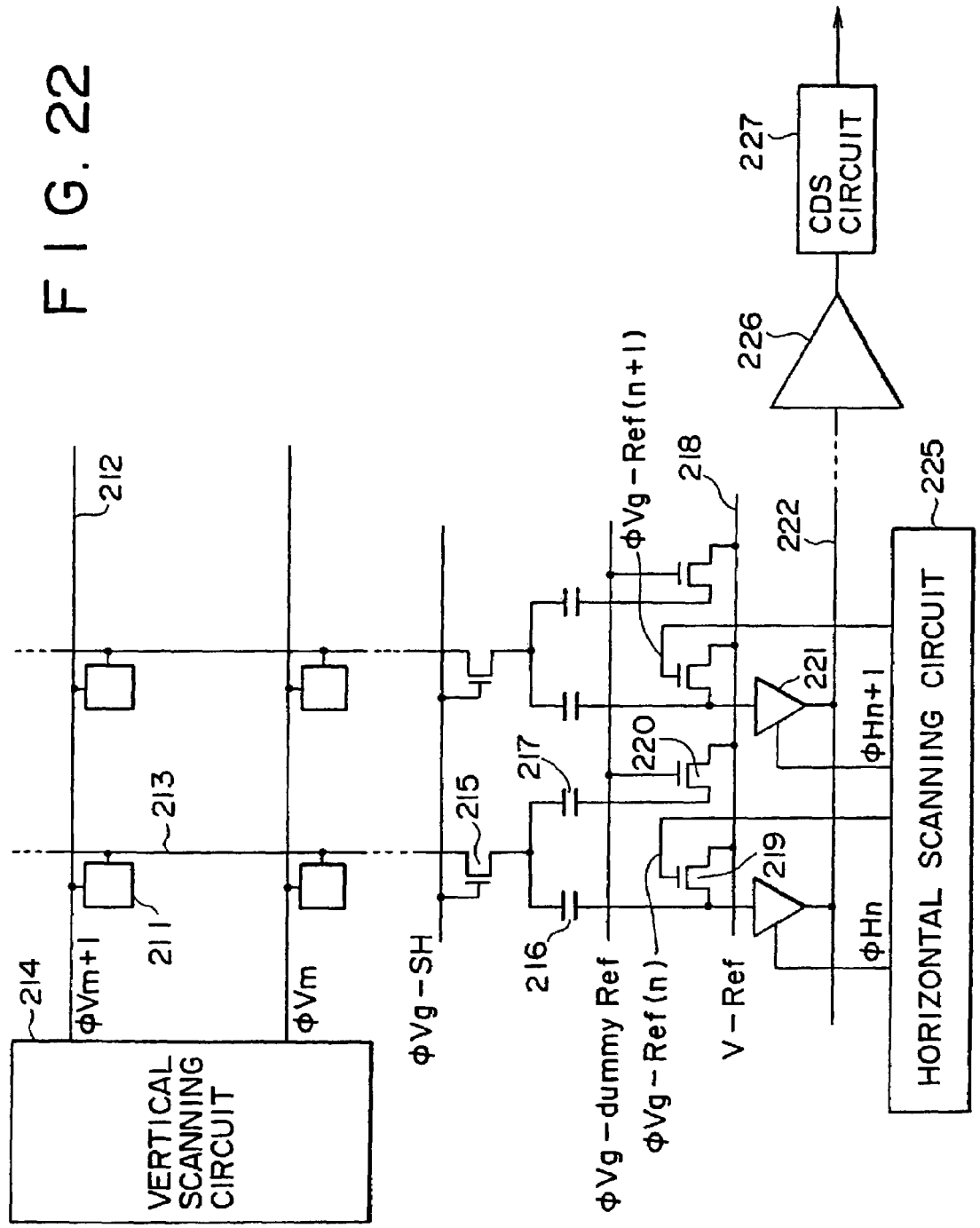
FIG. 22 is a schematic block diagram of a yet further solid state imaging device to which the present invention is applied.

FIG. 22 is a schematic block diagram showing a yet further solid state imaging device to which the present invention is applied. The solid state imaging device is a modification to the solid state imaging device described hereinabove with reference to FIG. 18, and in FIG. 22, equivalent parts to those of FIG. 18 are denoted by same reference symbols.

While, in the solid state imaging device of the preceding embodiment described with reference to FIG. 18, the reference pulse signal φVg-Ref is applied commonly to the reference switches 219 of the individual columns, the solid state imaging device of the present embodiment is constructed such that reference pulse signals φVg-Ref ( . . . , φVg-Ref(n), φVg-Ref(n+1), . . . ) different from each other for the individual columns are applied to the reference switches 219 of the individual rows. Those reference pulse signals φVg-Ref ( . . . , φVg-Ref(n), φVg-Ref(n+1), . . . ) are outputted, for example, from the horizontal scanning circuit 225.

Figure 23:
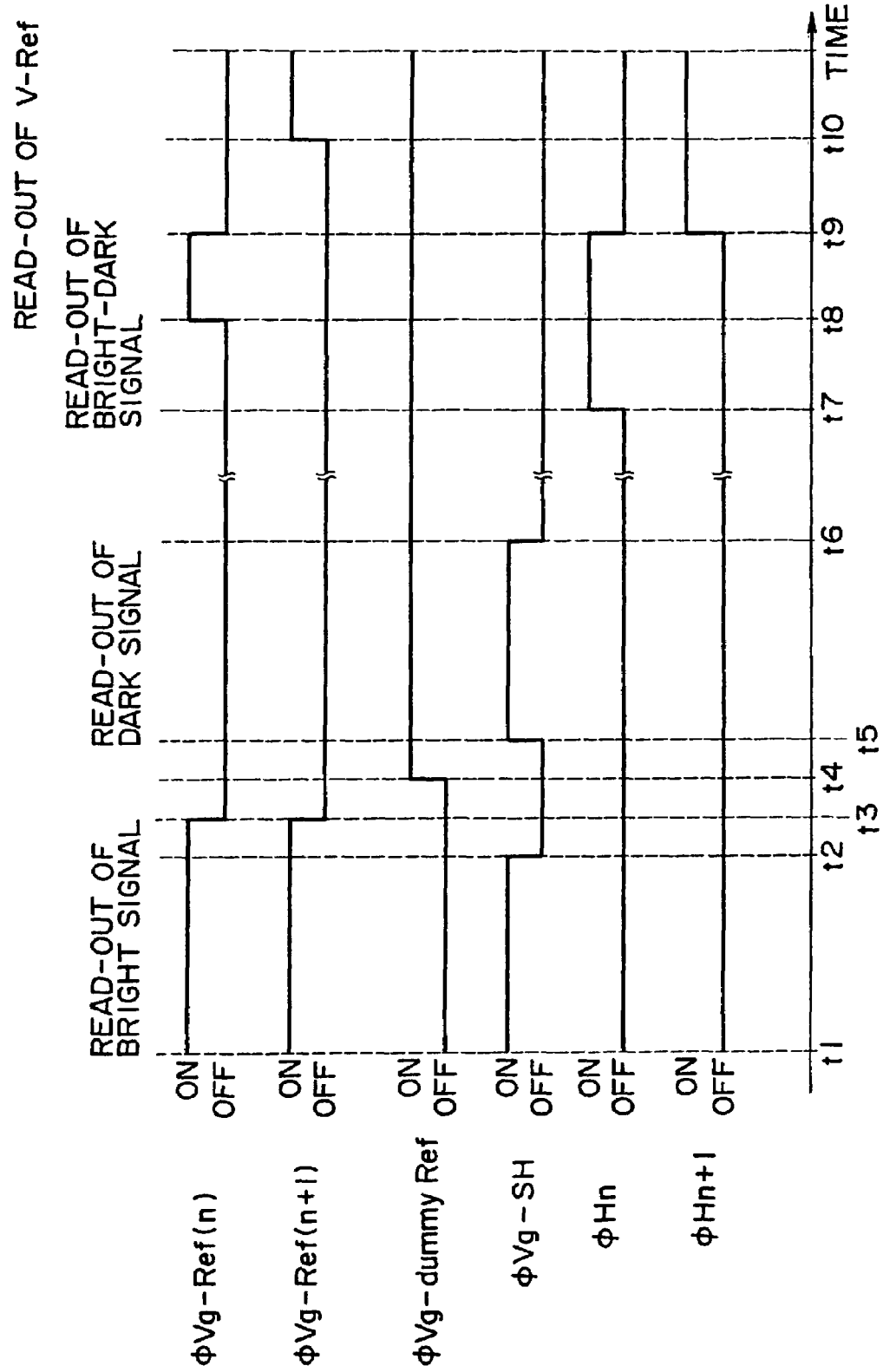
FIG. 23 is a timing chart illustrating operation of the solid state imaging device of FIG. 22.

A timing chart illustrating operation of the solid state imaging device of the present embodiment is shown in FIG. 23. In the timing chart, operation from the point t1 of time to the point t6 of time, that is, operation until a signal voltage is sample held, is quite same as that in the case of the solid state imaging device of the preceding embodiment, and overlapping description of it is omitted here to avoid redundancy. Thus, operation when a signal voltage is outputted to the horizontal signal line 222 is described below.

In a horizontal effective period, a horizontal scanning pulse signal φH ( . . . , φHn, φHn+1, . . . ) is successively outputted from the horizontal scanning circuit 225 and the horizontal selection switch 224 (refer to FIG. 19) of the vertical output circuit 221 of the nth column is put into an on-state at the point t7 of time. Consequently, the signal voltage (Vsigd−Vsigl+V-Ref) of the nth row is read out into the horizontal signal line 222 by the vertical output circuit 221.

Then, at the point t8 of time, the reference pulse signal φVg-Ref(n) for the nth column changes to the "H" level and the reference switch 219 for the nth column is put into an on-state, and consequently, the reference voltage V-Ref is read out into the horizontal signal line 222 by the vertical output circuit 221. In this instance, although the dummy reference pulse signal φVg-dumy Ref may have either one of the "H" level and the the "L" level, in the solid state imaging device of the present embodiment, it is assumed that it maintains the "H" level so that no wasteful operation may be performed.

Then, when, at the point t9 of time, the horizontal scanning pulse signal φHn for the nth column disappears and another horizontal scanning pulse signal φHn+1 for the n+1th column is generated, the horizontal selection switch 224 for the n+1th column is turned on so that the signal voltage (Vsigd−Vsigl+V-Ref) of the n+1th column is read out into the horizontal signal line 222 by the vertical output circuit 221. Thereafter, the reference pulse signal φVg-Ref(n+1) for the n+1th column changes to the "H" level and the reference switch 219 for the n+1th column is put into an on-state. Consequently, the reference potential V-Ref is read out into the horizontal signal line 222 by the vertical output circuit 221 for the n+1th column.

Thereafter, similar operation is performed in order over one line. The signal voltages (Vsigd−Vsigl+V-ref) and the reference potentials V-Ref read out successively into the horizontal signal line 222 in this manner are successively transmitted in units of a column on the time base by the horizontal signal line 222 and supplied to the CDS circuit 227 through the horizontal output circuit 226. Then, correlation double sampling is performed by the CDS circuit 227 to calculate finite differences between them.

By the construction described above, similarly as in the case of the solid state imaging device of the preceding embodiment, a signal from which not only fixed pattern noises arising from characteristic dispersions of the pixels 211 but also vertical string-like fixed pattern noises arising from characteristic dispersions of circuits such as noise components caused by switching of the sampling switches 215, offset dispersions of the source follower circuits 223 or noise components caused by switching of the horizontal selection switches 224 have been removed is obtained.

It is to be noted that, while, in the solid state imaging devices described above with reference to FIGS. 18 and 22, a signal is outputted as a voltage from each pixel 211, a source follower circuit may be constructed using a BCMD or a CMD as a drive transistor, or the resistor of the source follower circuit may be replaced by a capacitor to effect a capacitive load reading out operation.

In the case of a capacitive load reading out operation, the load capacitor 216 and the dummy capacitor 217 are utilized as loads upon reading out in a bright state and reading out in a dark state, respectively. However, in the case of a capacitive load operation, addition of means (such as a transistor) for resetting the vertical signal lines 213 to a fixed potential immediately before a signal in a bright state or a dark state to the circuit of the present invention is required.

Where any of the solid state imaging devices described above with reference to FIGS. 18 and 22 is applied as the imaging device 102 of the camera described hereinabove with reference to FIG. 13, the camera can suppress not only fixed pattern noises arising from characteristic dispersions of the pixels but also vertical string-like fixed pattern noises arising from characteristic dispersions of circuits.

Having now fully described the invention, it will be apparent to one of ordinary skill in the art that many changes and modifications can be made thereto without departing from the spirit and scope of the invention as set forth herein.

What is claimed is:

1. A solid state imaging device, comprising:
   a plurality of pixels arranged in rows and columns;
   a vertical scanning circuit for controlling control electrodes of the pixels in the same rows connected commonly by vertical selection lines;
   a horizontal scanning circuit for successively outputting pixel signals outputted through vertical signal lines, to which main electrodes of the pixels of the same columns are connected commonly in the units of a row;
   an output circuit for outputting the pixel signals from said horizontal scanning circuit to the outside;
   said solid state imaging device having a first operation mode in which the pixels are reset after the pixel signals are read out and a second operation mode in which the pixel signals are read out after the pixels are reset; and
   a memory device for storing a reference signal for each column that reflects a dispersion characteristic of the respective column;
   wherein said solid state imaging device obtains each reference signal as a result of performing the second operation mode.

2. The solid state imaging device according to claim 1, wherein processing of the second operation mode is performed at an initial stage after a power supply to said device is made available.

3. The solid state imaging device according to claim 1, wherein processing of the second operation mode is performed in a vertical OPB period of a pixel section.

4. The solid state imaging device according to claim 1, wherein said horizontal scanning circuit has a first and a second plurality of storage elements; in the first operation mode, said first storage elements store the pixel signals prior to resetting of the pixels and said second storage elements store the pixel signals after resetting of the same pixels; in the second operation mode, said first and second storage elements store the pixel signals after resetting of the same pixels; and wherein said output circuit is constructed such that finite differences of output signals of said first and second storage elements are calculated.

5. The solid state imaging device according to claim 4, wherein, in the second operation mode, after the pixels in a certain pixel row are reset in a horizontal scanning period, the signals after resetting of the pixels are read out into said first storage element, and the pixels of the pixel row are reset again, whereafter the signals after resetting of the pixels are read out into said second storage element, and then the signals of said first and second storage elements are successively outputted in a horizontal image period.

6. The solid state imaging device according to claim 4, wherein, in the second operation mode, after the pixels of a certain pixel row are reset in a horizontal scanning period, the signals after resetting of the pixels are read out into said first and second storage elements, and then the signals of said first and second storage elements are successively outputted in a horizontal image period.

7. A signal processing method for a solid state imaging device which includes a plurality of pixels arranged in rows and columns, a vertical scanning circuit for controlling control electrodes of the pixels in the same rows connected commonly by vertical selection lines, a horizontal scanning circuit for successively outputting pixel signals outputted through vertical signal lines, to which main electrodes of the pixels of the same columns are connected commonly in units of a row, and an output circuit for outputting the pixels signals from said horizontal scanning circuit to the outside, and has a first operation mode in which the pixels are reset after the pixel signals are read out and a second operation mode in which the pixel signals are read out after the pixels are reset, the method comprising the steps of:

holding an output signal of said solid state imaging device obtained in the second operation mode as a reference signal that reflects a dispersion characteristic of one of the columns; and performing, in the first operation mode, correction processing of another output signal of said solid state imaging device using the reference signal for the one column.

8. The signal processing method for a solid state imaging device according to claim 7, wherein the step of holding includes the step of storing the reference signal into a memory; wherein the other output signal is another reference signal that reflects a dispersion characteristic of the one column; and wherein the step of performing correction processing includes the steps of calculating an average value between the other reference signal and the value stored in said memory and storing the calculated average value into said memory.

9. A camera, comprising:

a solid state imaging device which includes a plurality of pixels arranged in rows or columns, a vertical scanning circuit for controlling control electrodes of the pixels in the same rows connected commonly by vertical selection lines, a horizontal scanning circuit for successively outputting pixel signals outputted through vertical signal lines, to which main electrodes of the pixels of the same columns are connected commonly in units of a row, and an output circuit for outputting the pixels signals from said horizontal scanning circuit to the outside, and has a first operation mode in which the pixels are reset after the pixel signals are read out and a second operation mode in which the pixel signals are read out after the pixels are reset;

an optical system for introducing incident light to an imaging area of said solid state imaging device; and a signal processing circuit for holding an output signal of said solid state imaging device obtained in the second operation mode as a reference signal that reflects a dispersion characteristic of one of the columns and for performing correction processing of another output signal of said solid state imaging device in the first operation mode using the reference signal.

* * * * *